United States Patent
Ikedo

(10) Patent No.: US 8,610,800 B2
(45) Date of Patent: Dec. 17, 2013

(54) IMAGE PROCESSING DEVICE AND METHOD FOR DETECTING AND CORRECTING PATTERN NOISE

(75) Inventor: Hideki Ikedo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/538,023

(22) Filed: Aug. 7, 2009

(65) Prior Publication Data

US 2010/0039538 A1 Feb. 18, 2010

(30) Foreign Application Priority Data

Aug. 12, 2008 (JP) ................................ 2008-207787
Apr. 7, 2009 (JP) ................................ 2009-092987

(51) Int. Cl.
*H04N 5/217* (2011.01)

(52) U.S. Cl.
USPC ............ 348/241; 348/607; 348/618; 348/683

(58) Field of Classification Search
USPC ......... 348/533, 241, 470, 553, 606, 607, 618, 348/683; 382/164, 232, 233, 240, 254, 26, 382/261, 263, 264, 275, 276
See application file for complete search history.

(56) References Cited

U.S. PATENT DOCUMENTS

| | | | |
|---|---|---|---|
| 7,898,583 B2 | 3/2011 | Wakahara et al. | |
| 2003/0007186 A1* | 1/2003 | Suino et al. | 358/3.15 |
| 2003/0138154 A1* | 7/2003 | Suino | 382/240 |
| 2004/0008904 A1* | 1/2004 | Lin et al. | 382/275 |
| 2005/0259166 A1* | 11/2005 | Tsuda et al. | 348/241 |
| 2006/0007504 A1* | 1/2006 | Inaba et al. | 358/463 |
| 2007/0253636 A1* | 11/2007 | Okada | 382/264 |
| 2008/0122953 A1* | 5/2008 | Wakahara et al. | 348/241 |
| 2008/0175511 A1* | 7/2008 | Horie | 382/260 |
| 2008/0199100 A1* | 8/2008 | Ishiga | 382/263 |
| 2009/0244331 A1* | 10/2009 | Suzuki et al. | 348/243 |
| 2010/0066867 A1* | 3/2010 | Yoshikawa | 348/241 |

FOREIGN PATENT DOCUMENTS

| | | |
|---|---|---|
| CN | 1723691 A | 1/2006 |
| CN | 101064770 A | 10/2007 |
| JP | 2002-133399 A | 5/2002 |

(Continued)

OTHER PUBLICATIONS

Korean Office Action for Appln. No. 10-2009-0071565 dated Jul. 27, 2011.

(Continued)

*Primary Examiner* — Nicholas Giles
*Assistant Examiner* — Abdelaaziz Tissire
(74) *Attorney, Agent, or Firm* — Carter, DeLuca, Farrell & Schmidt LLP

(57) ABSTRACT

An image processing device is comprised of: a frequency component resolution section for resolving an image obtained from an image sensor having a light-shielded pixel area and a non-light-shielded pixel area into two or more frequency components; a noise amount calculation section for calculating a noise amount for the frequency component based on the frequency component in the light-shielded pixel area; a noise suppression section for suppressing the noise component for the frequency component in the non-light-shielded pixel area according to the noise amount that has been calculated by the noise amount calculation section; and a frequency component synthesis section for synthesizing the frequency component that has been resolved by the frequency component resolution section to thereby form an image.

8 Claims, 30 Drawing Sheets

(56) References Cited

FOREIGN PATENT DOCUMENTS

| JP | 2006-309749 A |   | 11/2006 |
|----|---------------|---|---------|
| JP | 2007082097    | * | 3/2007  |
| JP | 2007082097 A  | * | 3/2007  |
| JP | 2007-300179 A |   | 11/2007 |
| JP | 2008-015741 A |   | 1/2008  |
| WO | 2005/032122 A1|   | 4/2005  |

OTHER PUBLICATIONS

Office Action issued on May 28, 2013 in counterpart Japanese Application No. 2009-092987.

* cited by examiner

INPUT IMAGE

LH IMAGE AT RESOLUTION LEVEL 1

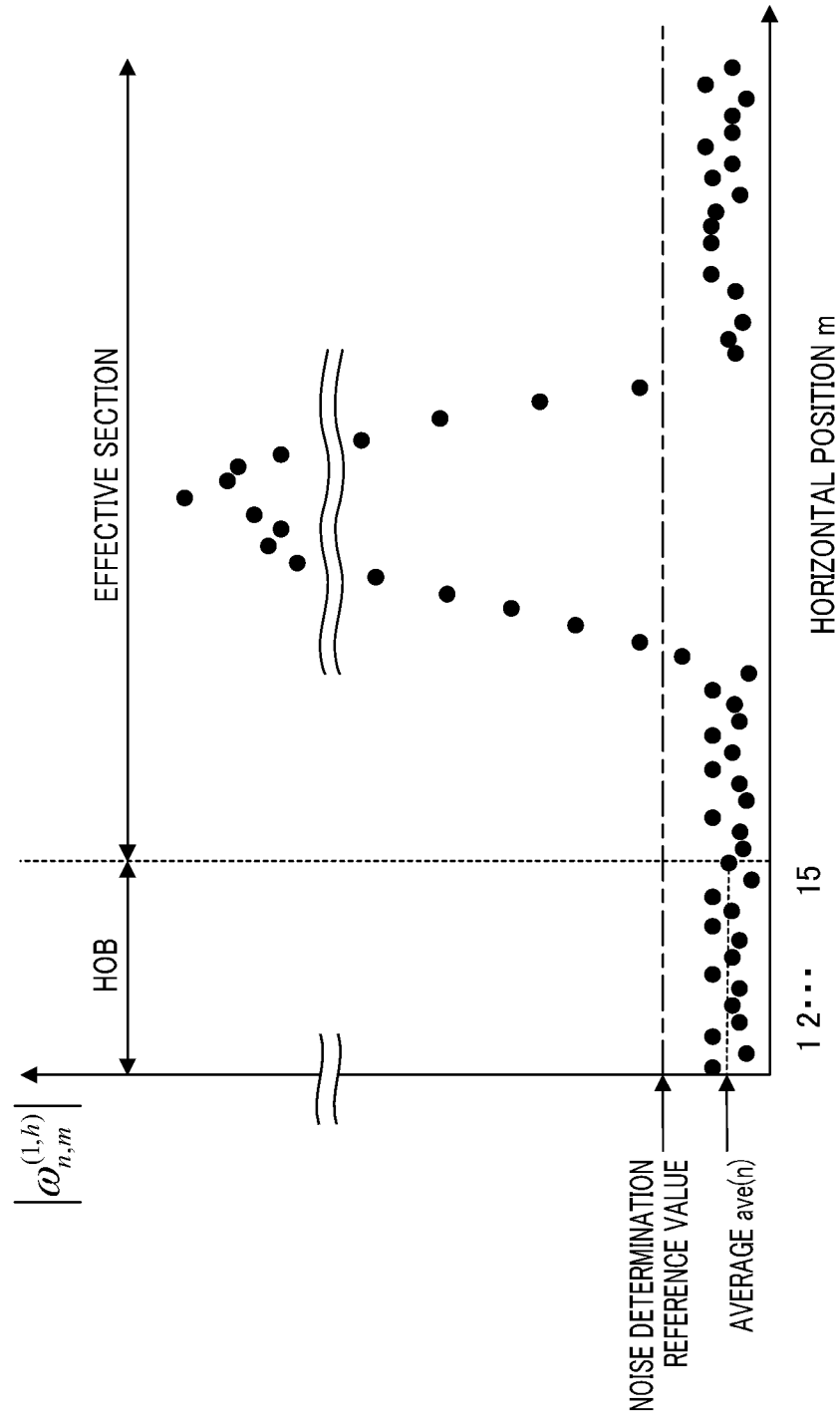

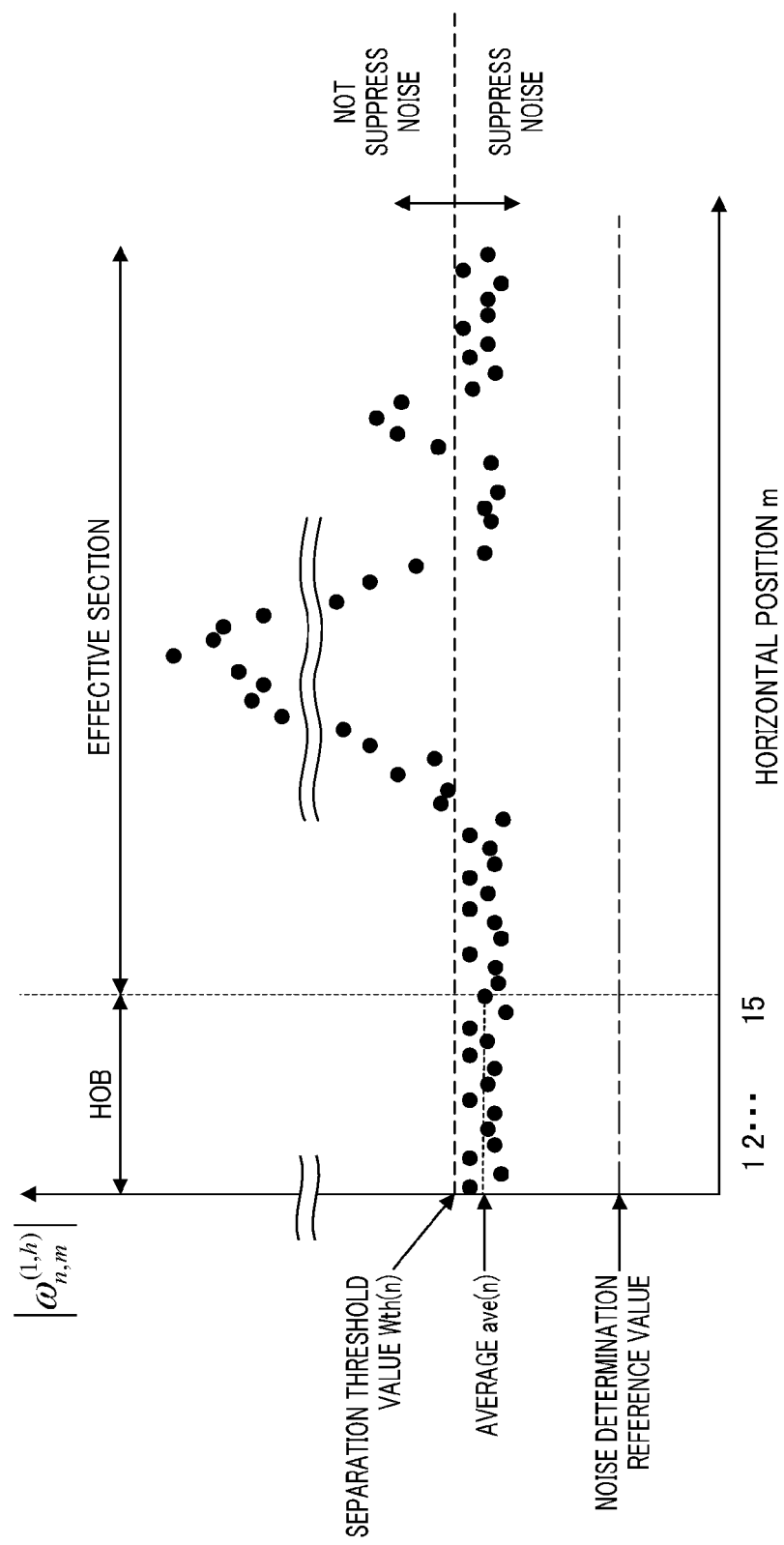

MAXIMUM VALUE FOR EACH COLUMN CALCULATED FROM ABSOLUTE VALUES OF EXPANSION COEFFICIENTS OF LH IMAGE

HORIZONTAL POSITION INTENSITY RATIO OF PATTERN NOISE COMPONENT BASED ON OB SECTION

INPUT IMAGE

LH IMAGE AT RESOLUTION LEVEL 1

ABSOLUTE VALUES OF EXPANSION COEFFICIENTS OF ROW, IN WHICH NOISE OCCURS, IN LH IMAGE

ABSOLUTE VALUES OF EXPANSION COEFFICIENTS
AFTER SUBTRACTION OF PATTERN NOISE COMPONENT

IMAGE PROCESSING DEVICE AND METHOD FOR DETECTING AND CORRECTING PATTERN NOISE

BACKGROUND OF THE INVENTION

1. Field of the Invention

The present invention relates to an image processing device, an image sensing apparatus, and an image processing method, which are used for carrying out image processing on an image that has been obtained from an image sensor such as a CCD (Charge Coupled Device) image sensor or a CMOS (Complementary Metal Oxide Semiconductor) image sensor. In particular, the present invention relates to the image quality enhancement of a shot image.

2. Description of the Related Art

An image sensor such as a CCD image sensor or a CMOS image sensor is used for an image sensing apparatus such as a digital camera or a video camera. In recent years, the number of pixels on the image sensor has been increased accompanying the reduction in the size of each pixel. The use of an image sensor having an increased number of pixels still requires high-speed processing so as not to lose usability such as when using continuous shooting speed. An exemplary method of high-speed processing includes a multi-channel approach that provides a plurality of output pathways for an image sensor so as to simultaneously read out a plurality of pixels. However, there arises a case that pixels are susceptible to being affected by noise, since optical signals become small due to the reduction in pixel size. In addition, the noise amount differs depending on the output pathways under the influence of multi-channel effects.

For example, in a multi-channeled CMOS image sensor having a plurality of output amplifiers, level differences occur in each column if there are fluctuations in the characteristics of these output amplifiers. This level difference is called "pattern noise in the vertical direction". In addition, since the power supply and the GND (grounding) are shared for each pixel, a level difference occurs in the entire selected row if the power supply and the GND for each pixel fluctuates during the reading out of the selected row. This level difference is called "pattern noise in the horizontal direction".

Pattern noise in the horizontal direction may cause an intensity difference in the left and right direction depending on the position at which the power supply and the GND are provided within the image sensor. Since the wiring length from the power supply and the GND for each pixel is different, an impedance of the wire is also different for different pixels. Hence, the impedance of the wiring increases the farther the pixel is positioned from the power supply and GND, whereby the influence of fluctuations in the power supply and the GND becomes stronger. As a consequence, the pattern noise intensity may increase at a position more distant from the power supply and the GND. Such pattern noise may cause image quality degradation, which requires reducing the amount of noise.

Since pattern noise in the vertical direction is to be determined uniquely by the characteristics of the output amplifiers, it can be corrected by the fluctuation correction for each output amplifier. On the other hand, pattern noise in the horizontal direction may become random if the fluctuations in the power supply and the GND are random. An exemplary method for correcting such pattern noise includes offset correction to be described below.

The image sensor is provided with an area called an optical black (hereinafter referred to as "OB") that is light-shielded so as not to allow light reflected from an object to reach the image sensor. Pattern noise also occurs in the OB section. Thus, in the offset correction, the pattern noise amount in the horizontal direction is calculated by calculating the average for each row of the horizontal optical black (hereinafter referred to as "HOB") provided in a strip at one end of the horizontal direction in the pixel area among the OB section. Pattern noise is corrected by subtracting this value from each row of the effective section which is non-light-shielded normal area.

Moreover, as a method for removing noise, a noise removal method utilizing frequency resolution has been proposed. Japanese Patent Laid-Open No. 2006-309749 discloses a method in which an image is resolved into low frequency components and high frequency components in a plurality of frequency bands by means of a multiple resolution transform, and noise removal processing is performed for each of the resolved low frequency components and high frequency components. In this method, an edge-preserving smoothing filter is used for noise removal processing, and the noise-removed frequency components are synthesized so as to obtain a corrected image.

In addition, Japanese Patent Laid-Open No. 2008-15741 discloses a method that repeats operations of resolving an image obtained by an image sensor into a high frequency component and a low frequency component, resolves the resulting components into a plurality of frequency bands, removes a noise component from a high frequency component in each frequency band to thereby obtain a corrected image through frequency synthesis. For noise removal from a high frequency component, a low frequency component in the same frequency band is subjected to an edge detecting filtering so as not to unintentionally remove an object edge component to thereby generate edge-preserving information. Noise from the place other than the edge section is removed utilizing this information.

Unfortunately, not only pattern noise generated for each row or column but also random noise generated randomly for each pixel are included in a shot image. When a large amount of random noise is present, the offset correction that subtracts the average for each row of the HOB area from the effective section cannot detect pattern noise accurately from the HOB area due to the influence of the random noise. In addition, when pattern noise having an intensity difference in the left and right direction occurs, the intensity difference in the left and right direction cannot be detected by the HOB area alone. As a result, in addition to a sufficient correction effect being unobtainable, the image quality may be degraded.

Since the noise removal method disclosed in Japanese Patent Laid-Open No. 2006-309749 uses the edge-preserving smoothing filter, any noise is corrected regardless of the presence or absence of noise at a place other than the edge section. Likewise, the noise removal method disclosed in Japanese Patent Laid-Open No. 2008-15741 also performs noise correction regardless of the presence or absence of noise at a position other than the position where an edge has been detected by the edge detecting filter. Therefore, conventional noise removal methods perform noise correction even at a position where there is originally no noise and thus correction is unnecessary, and the result of which may cause degradation of image resolution.

SUMMARY OF THE INVENTION

It is desired to provide an image processing device, an image sensing apparatus, and an image processing method, which can detect pattern noise having an intensity difference in the left and right direction or in an above and below direction accurately from a shot image and can improve image quality by correcting such pattern noise.

The present invention provides an image processing device comprising: a frequency component resolution section that resolves an image obtained from an image sensor having a light-shielded pixel area and a non-light-shielded pixel area into two or more frequency components; a noise amount calculation section that calculates a noise amount for the frequency component based on the frequency component in the light-shielded pixel area; a noise suppression section that suppresses the noise component for the frequency component in the non-light-shielded pixel area according to the noise amount that has been calculated by the noise amount calculation section; and a frequency component synthesis section that synthesizes the frequency component that has been resolved by the frequency component resolution section to thereby form an image.

It is desired that pattern noise having an intensity difference in the left and right direction or in an above and below direction can be detected accurately from a shot image, and image quality can be improved by correcting such pattern noise.

Further features of the present invention will become apparent from the following description of exemplary embodiments with reference to the mounted drawings.

BRIEF DESCRIPTION OF THE DRAWINGS

FIGS. 11A and 11B are respectively a view showing the absolute values of the wavelet expansion coefficients of the row, in which pattern noise is present, in the LH image and a view showing the absolute values of the wavelet expansion coefficients of the row, in which pattern noise does not occur, in the LH image.

DESCRIPTION OF THE EMBODIMENTS

Best modes for carrying out the present invention will now be described with reference to the accompanying drawings.

(First Embodiment)

Figure 1:
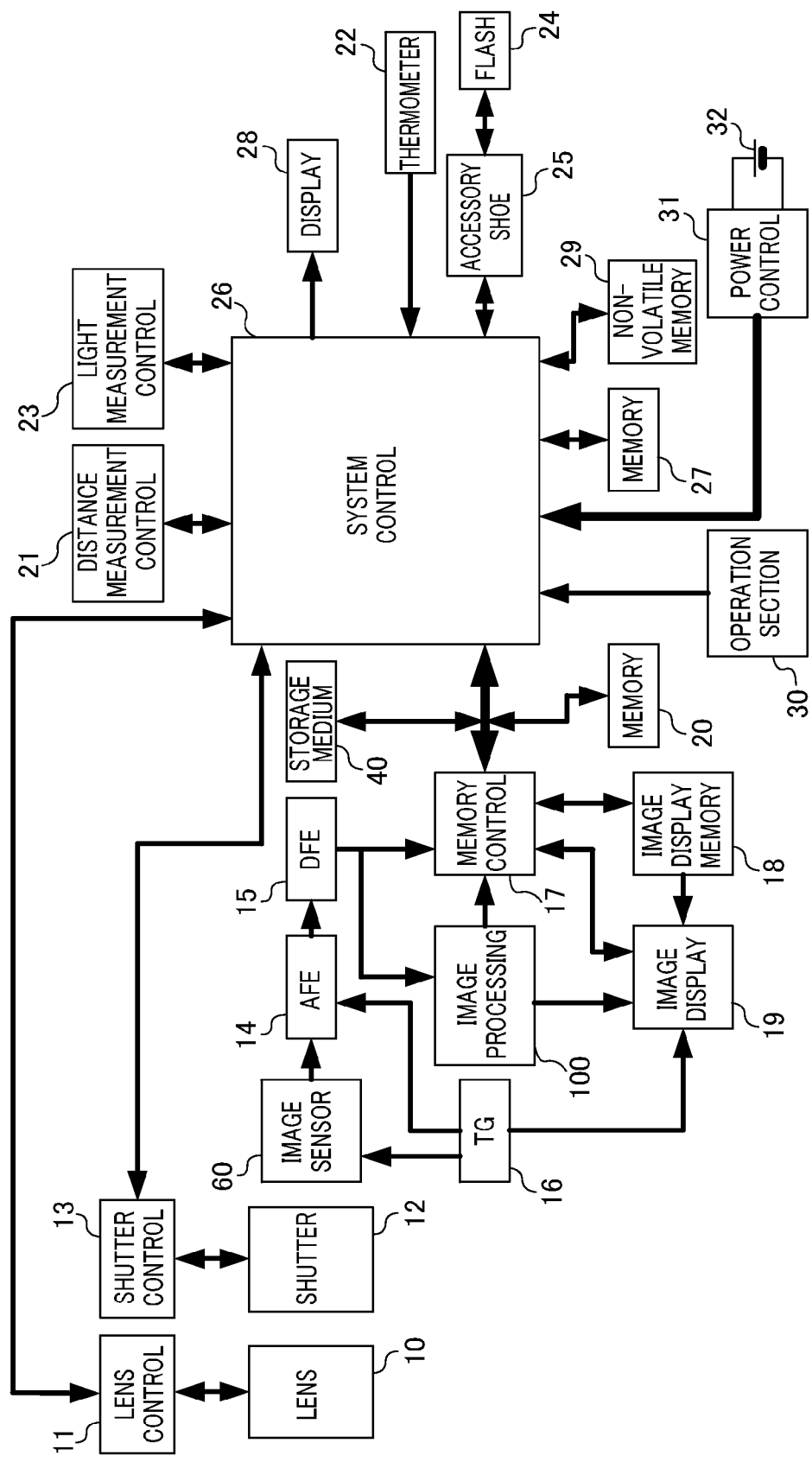
FIG. 1 is a block diagram showing a first embodiment of an image sensing apparatus with the image processing device of the present invention.

FIG. 1 is a block diagram showing a first embodiment of an image sensing apparatus with the image processing device of the present invention. The image sensing apparatus of the first embodiment is a digital camera and includes a taking lens 10, a lens control unit 11, a shutter 12, and a shutter control section 13. The image sensing apparatus also includes an analog front-end circuit (hereinafter referred to as "AFE") 14, a digital front-end circuit (hereinafter referred to as "DFE")

15, a timing generation circuit (hereinafter referred to as "TG") 16, a memory control circuit 17, and an image display memory 18. The image sensing apparatus further includes an image display section 19, a memory 20, a distance measurement control section 21, a thermometer 22, a light measurement control section 23, a flash section 24, an accessory shoe 25, a system control circuit 26, a memory 27, a display section 28, a non-volatile memory 29, an operation section 30, and a power control section 31. The image sensing apparatus still further includes a power section 32, a storage medium 40, an image sensor 60, and an image processing section 100.

The taking lens 10 is an image-taking lens for imaging an object image on the image sensor 60. The taking lens 10 is provided with a motor (not shown), and is provided with a mechanism that drives the motor to attain focus according to the processing results of the distance measurement control section 21 to be described below. The lens control unit 11 transmits information received from the taking lens 10 to the system control circuit 26 as well as controls operation of the taking lens 10. The shutter 12 is a mechanical shutter that controls the exposure amount of the image sensor 60. The shutter control section 13 controls the shutter 12.

The AFE 14 includes an A/D converter that converts an analog signal output from the image sensor 60 into a digital signal, the clamp circuit (offset regulator circuit), and a D/A converter. The DFE 15 receives a digital output from the AFE 14, and performs digital processing such as correction or rearrangement. The TG 16 supplies a clock signal or a control signal to the image sensor 60, the AFE 14, and the DFE 15. The TG 16 is controlled by the memory control circuit 17 and the system control circuit 26.

The memory control circuit 17 controls the AFE 14, the DFE 15, the TG 16, the image processing section 100, the image display memory 18, and the memory 20. Data from the DFE 15 is written in the image display memory 18 or the memory 20 via the image processing section 100 and the memory control circuit 17 or via just the memory control circuit 17. The image display memory 18 is a memory for displaying an image. The image display section 19 is a display panel for displaying an image, for example, an image display section composed of a LCD (Liquid Crystal Display) of the TFT (Thin Film Transistor) type. The memory 20 is a memory that stores a shot still image or moving image, and has a storage capacity sufficient for storing a predetermined number of still images and a predetermined time period of moving images.

The distance measurement control section 21 is controlled by the system control circuit 26 and performs distance measurement for carrying out the AF (auto focus) processing. Thermometer 22 performs temperature sensing for measuring the ambient temperature in the shooting environment or the internal temperature within the camera (around the image sensor or the like). The light measurement control section 23 is controlled by the system control circuit 26 and performs light measurement for carrying out the AE (auto exposure) processing. The light measurement control section 23 also has a function for flash shooting in association with the flash section 24.

The flash section 24 is an electronic flash that flashes auxiliary illumination light when the brightness of the object is low. The flash section 24 also has a floodlight function for AF auxiliary light. The flash section 24 is directly connected to the accessory shoe 25. However, depending on the shooting conditions, the flash section 24 can also be located in a position distant from the image sensing apparatus while connecting via a dedicated cable, or wirelessly connecting via a wireless communication section (not shown). The connection status of the flash section 24 can be determined using a part of the communication line of the accessory shoe 25, or can be determined from the communication status of the wireless communication section (not shown). In this particular embodiment, the flash section 24 is in a form which is removable from the image sensing apparatus. However, the flash section 24 may also be in a form which is incorporated in the image sensing apparatus. The accessory shoe 25 is a connecting section from which an accessory such as the flash section 24 is removable, and is fixedly installed on the image sensing apparatus.

The system control circuit 26 is a control section for the overall control of the image sensing apparatus of the present embodiment, and incorporates a known CPU or the like. The memory 27 is a storage means for storing the constants, variables, or programs for operating the system control circuit 26. The display section 28 is a display section for displaying the operating state or message according to the execution of a program by the system control circuit 26. The non-volatile memory 29 is a storage means such as an EEPROM (Electrically Erasable and Programmable ROM) in which various programs required for operating the image sensing apparatus have been stored.

The operation section 30 is an operation section including a main switch (activation switch) for inputting various operation instructions of the system control circuit 26, a shutter switch, a mode setting dial for switching the shooting mode, or the like. The power control section 31 includes a battery detection circuit or a DC-DC converter, and controls the power supply. The power section 32 is a power supply consisting of a primary battery such as alkali battery or lithium battery, a secondary battery such as NiCd battery, NiMH battery, and Li battery, an AC adapter, and the like. The storage medium 40 is a removable storage medium such as a memory card or hard disk. The storage medium can read and write information in the state in which it is installed to a read/write device (not shown).

The image sensor 60 converts an object image, i.e., optical image into an electrical signal. In this particular embodiment, a CMOS image sensor is used as the image sensor 60. The image sensor 60 has a micro lens ML for transmitting and condensing light for each pixel and a Bayer pattern color filter CF having a different spectral transmittance provided on the surface of the semiconductor section that performs photoelectric conversion. The details of the image sensor 60 will be described later. The image processing section 100 performs various image processes such as predetermined pixel interpolation processing, color conversion processing, and pattern noise correction processing relative to data received from the DFE 15 or data received from the memory control circuit 17. In this particular embodiment, the image sensor 60 has features particularly in regard to pattern noise correction processing, the details of which will be described later.

Figure 2:
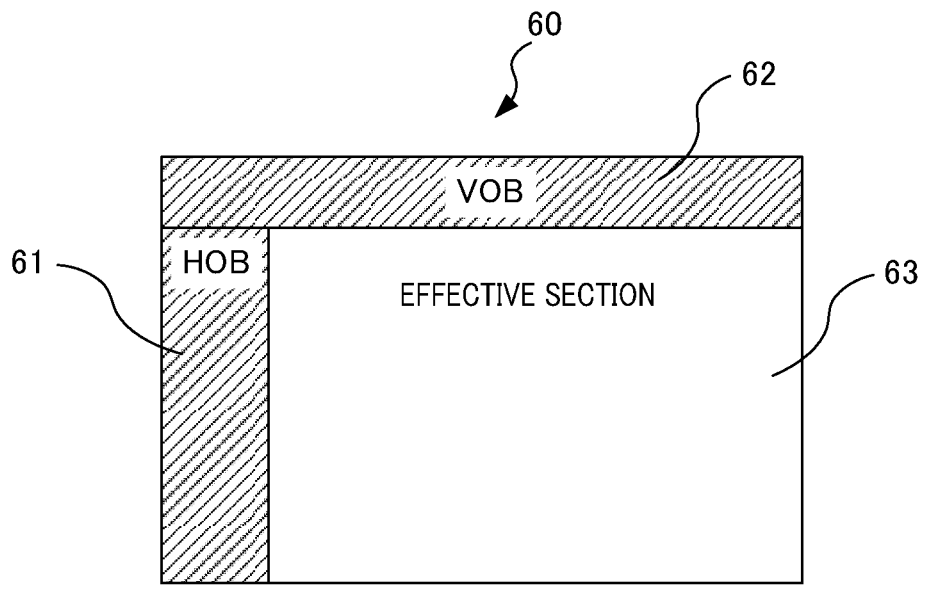
FIG. 2 is a view showing a schematic configuration of an image sensor 60 of the first embodiment using the CMOS image sensor.

FIG. 2 is a view showing a schematic configuration of the image sensor 60 of the first embodiment using the CMOS image sensor. The image sensor 60 includes a horizontal optical black (hereinafter referred to as "HOB") 61, a vertical optical black (hereinafter referred to as "VOB") 62, and an effective section 63 as the pixel area. The HOB 61 is a light-shielded pixel area provided in a strip at one end of the horizontal direction in the pixel area and light-shielded so as not to allow light reflected from an object to reach the image sensor 60. In the example in FIG. 2, the HOB 61 is provided at the left end of the image sensor 60. The VOB 62 is a light-shielded pixel area provided in a strip at one end of the vertical direction in the pixel area and light-shielded so as not to allow light reflected from an object to reach the image sensor 60. In the example in FIG. 2, the VOB 62 is provided at the upper end of the image sensor 60. The effective section 63 is a non-light-shielded pixel area to which light reflected from an object can be reached without being light-shielded.

Figure 3:
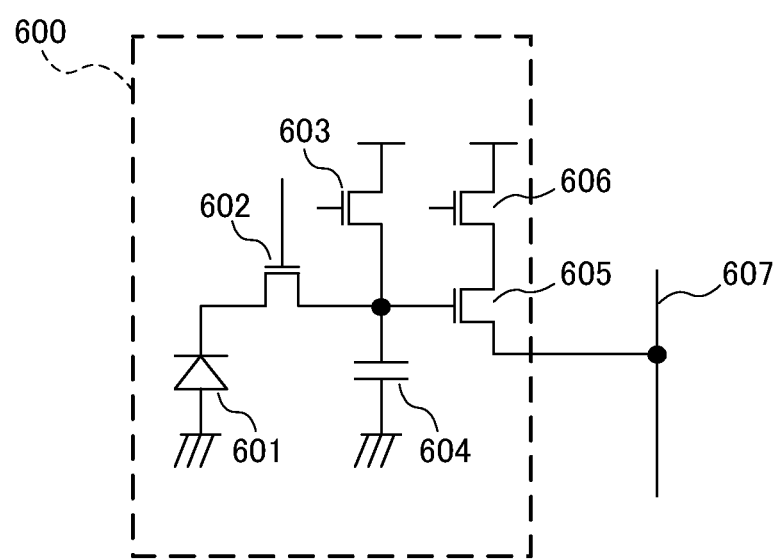
FIG. 3 is a view showing an example of the circuit for the unit pixel (one pixel) 600 of the CMOS image sensor.

FIG. 3 is a view showing an example of the circuit for the unit pixel (one pixel) 600 of the CMOS image sensor. The unit pixel 600 includes a photodiode (hereinafter referred to as "PD") 601, a transfer switch (hereinafter referred to as "TX") 602, a reset switch 603, a floating diffusion amplifier (hereinafter referred to as "FD") 604, an amplifier 605, and a row selection switch 606. The unit pixel 600 is connected to a vertical output line 607. The PD 601 receives light of the object image that has been focused by the taking lens 10 (see FIG. 1) to generate and accumulate an electric charge. The TX 602 is a switch that transfers electric charge generated at the PD 601 to the FD 604, and is constituted by an MOS transistor. The reset switch 603 resets the potential of the FD 604. The FD 604 is a capacitor that temporarily accumulates electric charge. The amplifier 605 is an MOS amplifier for amplification that functions as a source follower. The row selection switch 606 is a row selection switch. With the aforementioned arrangement, the electric charge that has been accumulated in the PD 601 is transferred by the TX 602 to the FD 604 to convert this electric charge into a voltage, whereby the pixel output is output from the amplifier 605 to the vertical output line 607 via the source follower.

Figure 4:
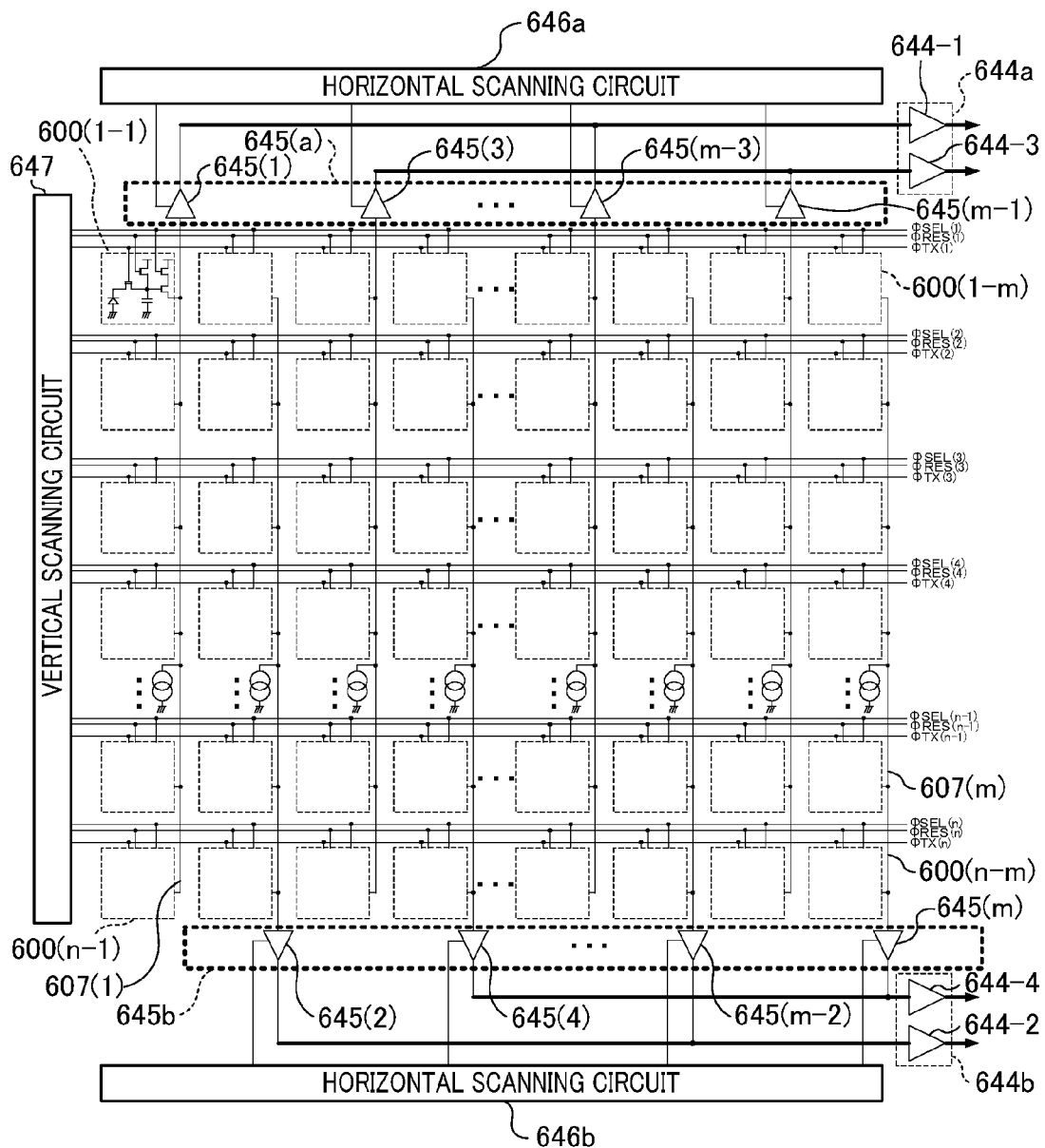
FIG. 4 is a view showing the overall layout of the CMOS image sensor in a multi-channel configuration adopted by the image sensor 60 of the first embodiment.

FIG. 4 is a view showing the overall layout of the CMOS image sensor in a multi-channel configuration adopted by the image sensor 60 of the first embodiment. In the arrangement shown in FIG. 4, the unit pixels 600, which have already been described in FIG. 3, are arranged in a form of an n by m matrix (unit pixels 600(1-1) to 600(n-m)), where n and m are natural numbers. The accumulation control for each pixel is performed by signals (TX 602 control signal φTX, reset switch 603 control signal φRES, and row selection switch 606 control signal φSEL) generated from a vertical scanning circuit 647.

Also, the vertical output line 607 (607(1) to 607(m)) is connected in common with the unit pixels 600 arrayed in the vertical direction. This vertical output line 607 is connected to a S-N circuit 645 (645(1) to 645(m)) for each line. Control of the output selection of the S-N circuit 645 (645(1) to 645(m)) is performed by a horizontal scanning circuit 646 (646a and 646b). The output of the S-N circuit 645 (645(1) to 645(m)) is output to the subsequent processing circuits such as AFE 14 shown in FIG. 1 via output amplifiers 644 (644-1 to 644-4).

In order to accommodate high-speed processing, the CMOS image sensor shown in FIG. 4 is equipped with the four output amplifiers 644 such that a plurality of horizontal pixels (four pixels in FIG. 4) can be processed simultaneously, whereby signals are assigned to distinct output pathways for outputting the resulting data. In addition, in order to effectively layout this configuration, the output pathway is from the vertical output line 607 through the S-N circuit 645 to the output amplifier 644, and the output lines for odd numbered pixels (1 column, 3 column, and the like) among the horizontal pixels is arranged at the upper part of the image sensor construction. Likewise, the output line for even numbered pixels (2 column, 4 column, and the like) among the horizontal pixels is arranged at the lower part of the image sensor construction.

In other words, the signal output pathway of the CMOS image sensor adopted by the image sensor 60 of the present embodiment is broadly divided into the following two pathways. One is the signal output pathway for odd numbered columns, which is from the pixel output through the S-N circuit block 645a arranged at the upper part of the image sensor to the output amplifier blocks 644a (644-1 and 644-3) arranged at the upper part of the image sensor. The other is the signal output pathway for even numbered columns, which is from the pixel output through the S-N circuit block 645b arranged at the lower part of the image sensor to the output amplifier blocks 644b (644-2 and 644-4) arranged at the lower part of the image sensor.

The S-N circuit 645 serves to remove noise unique to the CMOS image sensor, whereby the S/N ratio equivalent to that of the CCD image sensor can be obtained. With regard to the pixel output of the row selected by the row selection switch 606, the signal component S and the noise component N are respectively retained to thereby subtract the noise component N from the signal component S for each pixel by the output amplifier 644, whereby the noise-less pixel signal is output.

The noise component is the one that retains the FD 604 that has been reset by the reset switch 603 while the TX 602 is turned OFF as the N (Noise) signal of the S-N circuit 645 via the amplifier 605, the row selection switch 606, and the vertical output line 607. Such a noise component includes the reset noise of the FD 604, the pixel-to-pixel fluctuations in the gate-source voltages of the amplifier 605, or the like. The signal component is retained as the S (Signal) signal in the S-N circuit 645, as in the noise component, by converting an electric charge generated from the PD 601 into a voltage in the FD 604 by turning ON the TX 602 by a pulse. The noise component is still included in the retained signal. By subtracting the N signal from the S signal as it is being read by an amplifier 644, the noise component is cancelled.

As described in the background art, when there are fluctuations in the characteristics of output amplifier block 644a (644-1 and 644-3) and 644b (644-2 and 644-4), substantially uniform level differences occur in each column, resulting in pattern noise in the vertical direction. In addition, since the power supply and GND are common among the respective pixels 600(1-1) to 600(n-m), the level difference occurs in the entire selected row if the power supply and the GND for these pixels fluctuates during the reading out of the selected row, resulting in pattern noise in the horizontal direction. Pattern noise in the vertical and horizontal directions occurs not only in the effective section but likewise occurs in the OB section. In this particular embodiment, these pattern noises are reduced by the operation of the image processing section 100.

Figure 5:
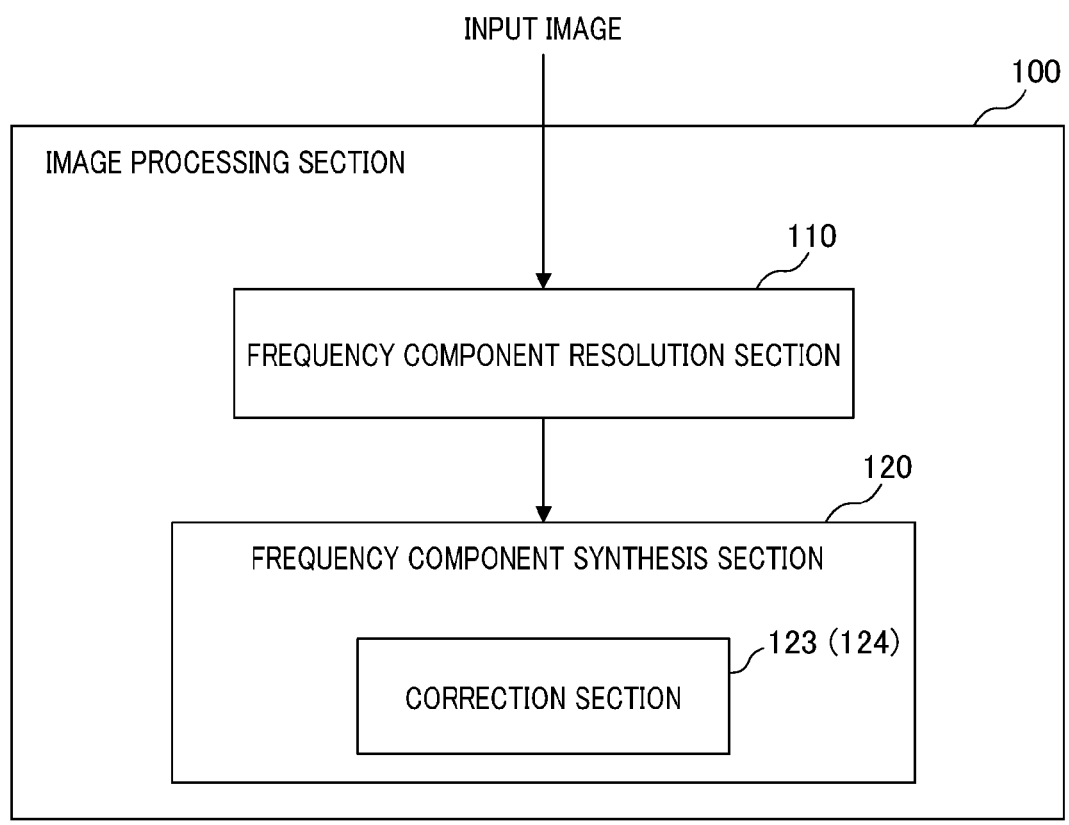
FIG. 5 is a block diagram showing an example of the circuit configuration of an image processing section 100.

FIG. 5 is a block diagram showing an example of the circuit configuration of the image processing section 100. The image processing section 100 includes the frequency component resolution section 110 and the frequency component synthesis section 120. Also, the frequency component synthesis section 120 includes the correction section 123(124). The frequency component resolution section 110 resolves an input image to the image processing section 100 into a plurality of frequency components by applying a wavelet transform. The frequency component synthesis section 120 carries out pattern noise suppression processing by the correction section 123 (124) on the frequency component that has been resolved by the frequency component resolution section 110. The resolved frequency component is then synthesized to obtain an output image. In this particular embodiment, the discrete wavelet transform DWT is used as a wavelet transform.

Figure 6:
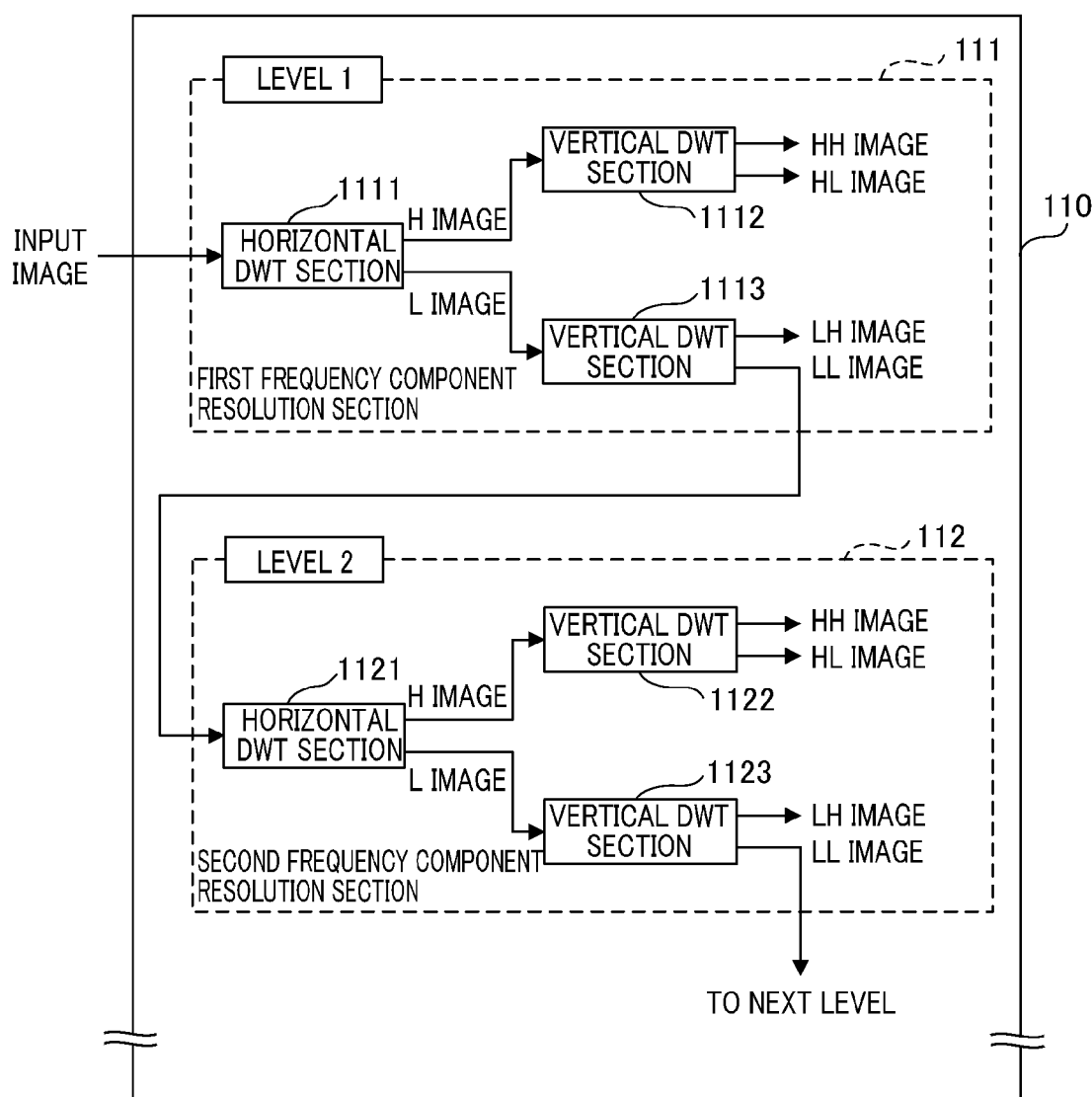
FIG. 6 is a functional block diagram showing an example of the circuit configuration of a frequency component resolution section 110.

FIG. 6 is a functional block diagram showing an example of the circuit configuration of the frequency component resolution section 110. As shown in FIG. 6, the frequency component resolution section 110 includes a plurality of frequency component resolution sections such as a first frequency component resolution section 111 (level 1), a second frequency component resolution section 112 (level 2), and so on. The frequency component resolution section 110 resolves an input image into a plurality of frequency components by applying a wavelet transform at the first frequency component resolution section 111, then at the second frequency component resolution section 112, and so on. The frequency component resolution section 110 also includes a plurality of horizontal DWT sections 1111, 1121, and so on and a plurality of vertical DWT sections 1112, 1113, 1122, 1123, and so on provided so as to correspond to the first frequency component resolution section 111, the second frequency component resolution section 112 and so on respectively.

The horizontal DWT sections 1111, 1121, and so on perform wavelet transform processing in the horizontal direction to the LL image generated by the input image or the vertical DWT sections 1113, 1123, and so on to be described below. By this wavelet transform processing, the horizontal DWT sections 1111, 1121, etc. generate a high frequency component consisting of the wavelet expansion coefficient and a low frequency component consisting of the scaling coefficient.

Figure 7:
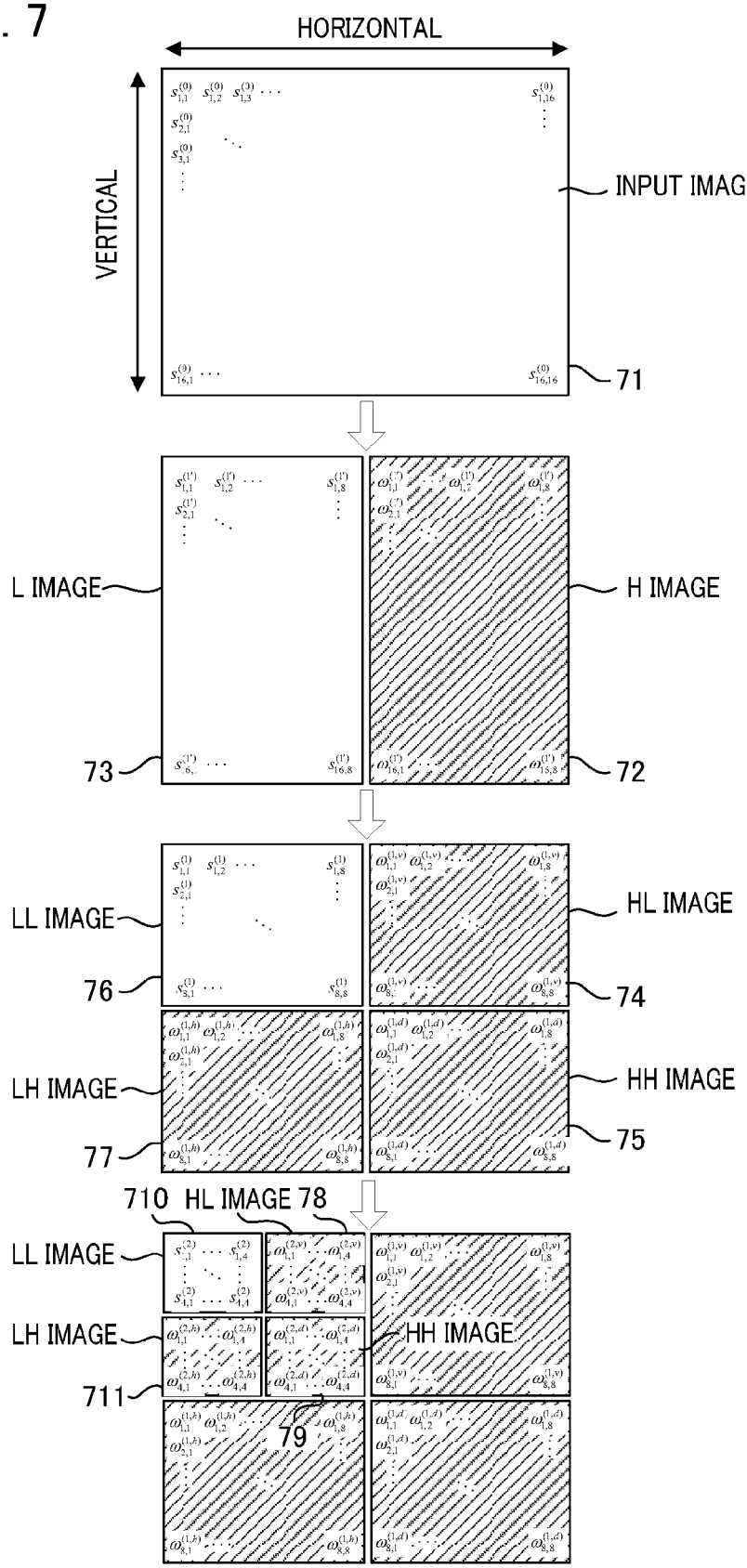
FIG. 7 is a view showing how the input image is resolved into a plurality of frequency components.

FIG. 7 is a view showing how the input image is resolved into a plurality of frequency components. As shown in FIG. 7, an input image 71 is resolved into two components: a high frequency component (H image 72) and a low frequency component (L image 73) in the horizontal direction. At this time, the numbers of pixels of an H image 72 and an L image 73 in the horizontal direction are reduced by half of those of the pre-resolved image. The vertical DWT sections 1112, 1122, etc. perform wavelet transform processing in the vertical direction to the H image generated by the horizontal DWT sections 1111, 1121, etc. so as to generate a vertical direction high frequency component and a diagonal direction high frequency component. In other words, as shown in FIG. 7, the H image 72 is resolved into two components: a vertical direction high frequency component (HL image 74) and a diagonal direction high frequency component (HH image 75). At this time, the numbers of pixels of the HL image 74 and the HH image 75 in the vertical direction are reduced by half of those of the pre-resolved image.

The vertical DWT sections 1113, 1123, and the like perform wavelet transform processing in the vertical direction to the L image generated by the horizontal DWT sections 1111, 1121, etc. so as to generate a low frequency component and a horizontal direction high frequency component. In other words, as shown in FIG. 7, the L image 73 is resolved into two components: a low frequency component (LL image 76) and a horizontal direction high frequency component (LH image 77). At this time, the number of pixels of the LL image 76 and the LH image 77 in the vertical direction is reduced by half of those of the pre-resolved image.

By means of the aforementioned processing in the first frequency component resolution section 111, the input image 71 shown in FIG. 7 is resolved into four images: the HH image 75, the HL image 74, the LH image 77, and the LL image 76. Among these four images, the LL image 76 is input to the second frequency component resolution section 112, and further resolved into four images: a HH image 79, a HL image 78, a LH image 711, and a LL the image 710. Among these four images, the LL image 710 is input to a third frequency component resolution section, and likewise resolved into four images: the HH, LH, HL, and LL images. In this way, the process of resolving the input image into three high frequency components with their direction components and one low frequency component and further resolving one low frequency component into three high frequency components and one low frequency component is repeated. By the aforementioned processing, the input image 71 is resolved into a plurality of frequency components. Here, resolution at the first frequency component resolution section 111, the second frequency component resolution section 112, and so on refers to resolution at level 1, 2, and so on, respectively.

A specific calculation example in frequency resolution processing will be described with reference to FIG. 7. Assume that the pixel size of the input image 71 is 16 by 16 and the value for each pixel is $s_{n,m}^{(0)}$, where n represents the vertical position, m represents the horizontal position, and the exponential number represents the resolution level. Level 0 is an input image. The horizontal DWT section 1111 calculates the L image 73 ($s_{n,m}^{(1')}$) consisting of the scaling coefficient and the H image 72 ($\omega_{n,m}^{(1')}$) consisting of the wavelet expansion coefficient by performing the calculation shown in Formula (1) and Formula (2) for each row of the input image 71 ($s_{n,m}^{(0)}$).

[Formula 1]

$$s_{1,1}^{(1')} = p_0 s_{1,1}^{(0)} + p_1 s_{1,2}^{(0)} + p_2 s_{1,3}^{(0)} + p_3 s_{1,4}^{(0)}$$
$$s_{1,2}^{(1')} = p_0 s_{1,3}^{(0)} + p_1 s_{1,4}^{(0)} + p_2 s_{1,5}^{(0)} + p_3 s_{1,6}^{(0)}$$
$$\vdots$$
$$s_{n,m}^{(1')} = p_0 s_{n,2m-1}^{(0)} + p_1 s_{n,2m}^{(0)} + p_2 s_{n,2m+1}^{(0)} + p_3 s_{n,2m+2}^{(0)}$$
$$\vdots$$

Formula (1)

[Formula 2]

$$\omega_{1,1}^{(1')} = q_0 s_{1,1}^{(0)} + q_1 s_{1,2}^{(0)} + q_2 s_{1,3}^{(0)} + q_3 s_{1,4}^{(0)}$$
$$\omega_{1,2}^{(1')} = q_0 s_{1,3}^{(0)} + q_1 s_{1,4}^{(0)} + q_2 s_{1,5}^{(0)} + q_3 s_{1,6}^{(0)}$$
$$\vdots$$
$$\omega_{n,m}^{(1')} = q_0 s_{n,2m-1}^{(0)} + q_1 s_{n,2m}^{(0)} + q_2 s_{n,2m+1}^{(0)} + q_3 s_{n,2m+2}^{(0)}$$
$$\vdots$$

Formula (2)

In Formula (1), $p_k$ (k=0 to 3) is a sequence representing scaling. In this particular embodiment, the Daubechies sequence shown in the following Table 1 is used.

| | |
|---|---|
| $p_0$ | 0.482962913 |
| $p_1$ | 0.836536304 |
| $p_2$ | 0.224143868 |
| $p_3$ | −0.129409523 |

Note that, the number of the sequence is the number of taps required for the calculation using Formula (1), and Formula (2). In this particular embodiment, the number of taps is four. In Formula (2), $q_k$ is a sequence representing wavelet, which can be calculated from the sequence $p_k$ representing scaling using Formula (3).

[Formula 3]

$$q_k = (-1)^k p_{1-k}$$

Formula (3)

The range of m for the L image 73 ($s_{n,m}^{(1')}$) and the H image 72 ($\omega_{n,m}^{(1')}$) is 1 to 8. The number of pixels in the horizontal direction is reduced by ½ (resolution: ½) of the input image, but n remains at 16, the original vertical number of pixels.

The vertical DWT section 1112 calculates the HL image 74 ($\omega_{n,m}^{(1,v)}$) and the HH image 75 ($\omega_{n,m}^{(1,d)}$) by performing the calculation shown in Formula (4) and Formula (5) for each column of the H image 72 ($\omega_{n,m}^{(1')}$) that has been resolved by the horizontal DWT section 1111.

[Formula 4]

$$\omega_{1,1}^{(1,v)} = p_0\omega_{1,1}^{(1')} + p_1\omega_{2,1}^{(1')} + p_2\omega_{3,1}^{(1')} + p_3\omega_{4,1}^{(1')}$$
$$\omega_{2,1}^{(1,v)} = p_0\omega_{3,1}^{(1')} + p_1\omega_{4,1}^{(1')} + p_2\omega_{5,1}^{(1')} + p_3\omega_{6,1}^{(1')}$$
$$\vdots$$
$$\omega_{n,m}^{(1,v)} = p_0\omega_{2n-1,m}^{(1')} + p_1\omega_{2n,m}^{(1')} + p_2\omega_{2n+1,m}^{(1')} + p_3\omega_{2n+2,m}^{(1')}$$
$$\vdots$$

Formula (4)

[Formula 5]

$$\omega_{1,1}^{(1,d)} = q_0\omega_{1,1}^{(1')} + q_1\omega_{2,1}^{(1')} + q_2\omega_{3,1}^{(1')} + q_3\omega_{4,1}^{(1')}$$
$$\omega_{2,1}^{(1,d)} = q_0\omega_{3,1}^{(1')} + q_1\omega_{4,1}^{(1')} + q_2\omega_{5,1}^{(1')} + q_3\omega_{6,1}^{(1')}$$
$$\vdots$$
$$\omega_{n,m}^{(1,d)} = q_0\omega_{2n-1,m}^{(1')} + q_1\omega_{2n,m}^{(1')} + q_2\omega_{2n+1,m}^{(1')} + q_3\omega_{2n+2,m}^{(1')}$$
$$\vdots$$

Formula (5)

Exponential sections v and d represent a vertical direction component and a diagonal direction component, respectively. The range of n for the HL image 74 ($\omega_{n,m}^{(1,v)}$) and the HH image 75 ($\omega_{n,m}^{(1,d)}$) is 1 to 8. The number of pixels in the vertical direction is reduced by ½ (resolution: ½) of the pre-resolved image. The vertical DWT section 1113 calculates the LL image 76 ($s_{n,m}^{(1)}$) and the LH image 77 ($\omega_{n,m}^{(1,h)}$) by performing the calculation shown in Formula (6) and Formula (7) for each column to the L image 73 ($s_{n,m}^{(1')}$) that has been resolved in the horizontal DWT section 1111.

[Formula 6]

$$s_{1,1}^{(1)} = p_0 s_{1,1}^{(1')} + p_1 s_{2,1}^{(1')} + p_2 s_{3,1}^{(1')} + p_3 s_{4,1}^{(1')}$$
$$s_{2,1}^{(1)} = p_0 s_{3,1}^{(1')} + p_1 s_{4,1}^{(1')} + p_2 s_{5,1}^{(1')} + p_3 s_{6,1}^{(1')}$$
$$\vdots$$
$$s_{n,m}^{(1,v)} = p_0 s_{2n-1,m}^{(1')} + p_1 s_{2n,m}^{(1')} + p_2 s_{2n+1,m}^{(1')} + p_3 s_{2n+2,m}^{(1')}$$
$$\vdots$$

Formula (6)

[Formula 7]

$$\omega_{1,1}^{(1,h)} = q_0 s_{1,1}^{(1')} + q_1 s_{2,1}^{(1)} + q_2 s_{3,1}^{(1')} + q_3 s_{4,1}^{(1')}$$
$$\omega_{2,1}^{(1,h)} = q_0 s_{3,1}^{(1')} + q_1 s_{4,1}^{(1')} + q_2 s_{5,1}^{(1')} + q_3 s_{6,1}^{(1')}$$
$$\vdots$$
$$\omega_{x,y}^{(1,h)} = q_0 s_{2n-1,m}^{(1')} + q_1 s_{2n,m}^{(1')} + q_2 s_{2n+1,m}^{(1')} + q_3 s_{2n+2,m}^{(1')}$$
$$\vdots$$

Formula (7)

In Formula (7), the exponential section h represents a horizontal direction component. The range of n for the LL image 76 ($s_{n,m}^{(1)}$) and the LH image 77 ($\omega_{n,m}^{(1,h)}$) is 1 to 8. The number of pixels in the vertical direction is reduced by ½ (resolution: ½) of the pre-resolved image. With the above procedures, the first frequency component resolution section 111 performs resolution (resolution level 1) with respect to the $s_{n,m}^{(0)}$ (n,m=1 to 16), i.e., the input image 71. As a result of resolution, three high frequency components $\omega_{n,m}^{(1,v)}$, $\omega_{n,m}^{(1,d)}$, and $\omega_{n,m}^{(1,h)}$ (n, m=1 to 8) and one low frequency component $s_{n,m}^{(1)}$ of which the resolution both in the horizontal direction and vertical direction has been reduced by half are output. Among them, $s_{n,m}^{(1)}$, i.e., a low frequency component is input to the second frequency component resolution section 112. The second frequency component resolution section 112 performs a similar calculation to that mentioned above with respect to $s_{n,m}^{(1)}$ to thereby output $\omega_{n,m}^{(2,v)}$, $\omega_{n,m}^{(2,d)}$, $\omega_{n,m}^{(2,h)}$, and $s_{n,m}^{(2)}$ (n, m=1 to 4).

Figure 8:
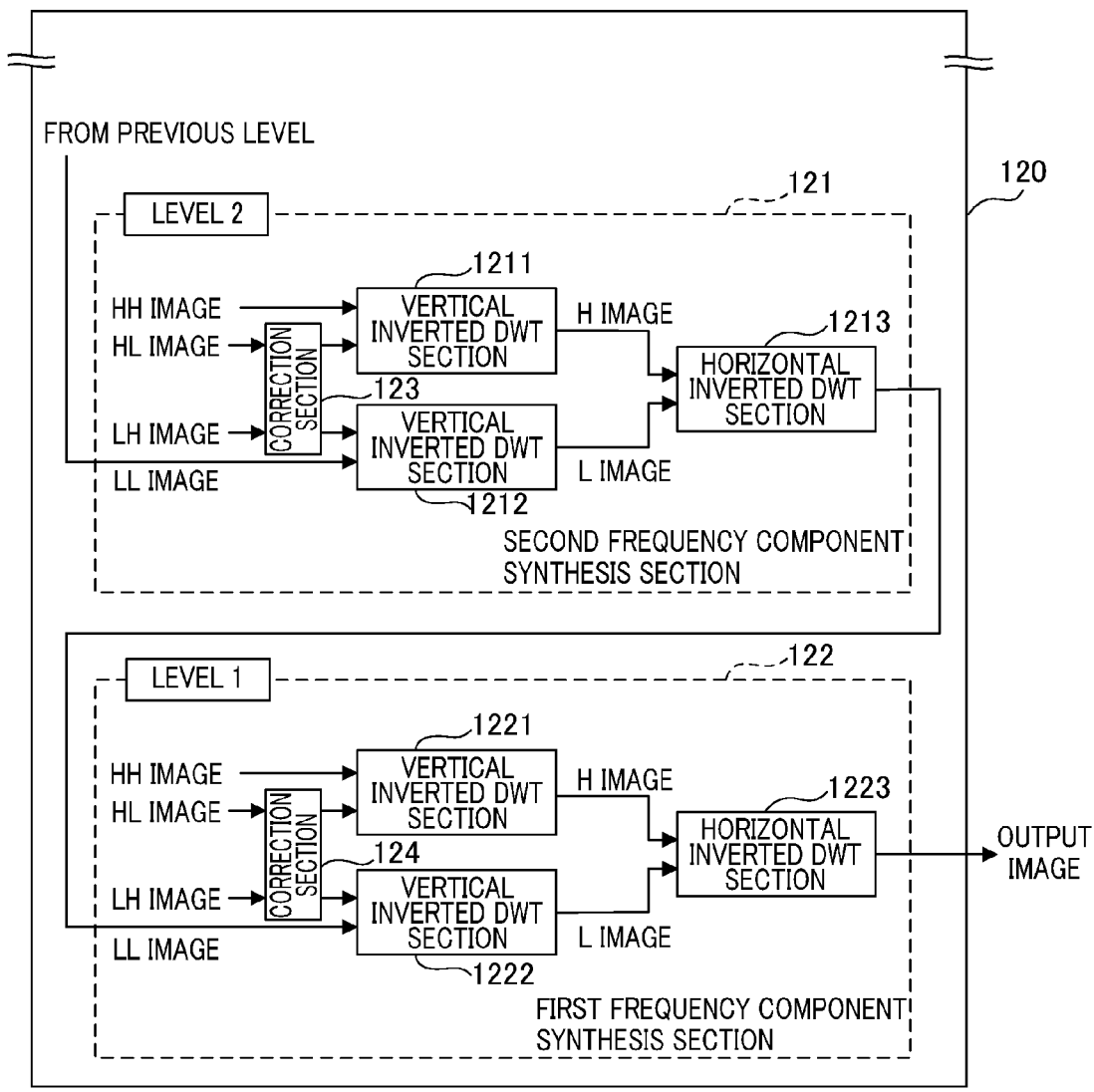
FIG. 8 is a functional block diagram showing an example of the circuit configuration of a frequency component synthesis section 120.

FIG. 8 is a functional block diagram showing an example of the circuit configuration of the frequency component synthesis section 120. The frequency component synthesis section 120 includes a plurality of frequency component synthesis sections such as a first frequency component synthesis section 121, a second frequency component synthesis section 122, and so on. The frequency component synthesis section 120 also includes a plurality of correction sections 123, 124, and so on provided so as to correspond to the respective frequency component synthesis sections. The frequency component synthesis section 120 synthesizes the HH, LH, HL, and LL images at the respective frequency bands, which have been generated by frequency component resolution processing performed by the frequency component resolution section 110, by applying an inverse wavelet transform. The frequency component synthesis section 120 includes vertical inverted DWT sections 1211, 1212, 1221, 1222, and so on and horizontal inverted DWT sections 1213, 1223, and so on provided so as to correspond to the first frequency component synthesis section 121, the second frequency component synthesis section 122, etc., respectively.

Each of the vertical inverted DWT sections applies the inverse wavelet transform in the vertical direction with respect to the HH, LH, HL, and LL images that have been generated by the frequency component resolution section 110 to thereby generate a high frequency image (H image) and a low frequency image (L image). The vertical inverted DWT sections 1211 and 1221 perform synthesis processing in the vertical direction with respect to the HH image and the HL image to thereby generate the H image. In other words, this corresponds to processing for synthesizing the HH image 75 and the HL image 74 shown in FIG. 7 to thereby generate the H image 72. This result of this processing is that the number of pixels in the vertical direction becomes double that of the pre-synthesized image. The vertical inverted DWT section 1212, 1222 performs synthesis processing in the vertical direction with respect to the LH image and the LL image to thereby generate the L image. In other words, this corresponds to processing for synthesizing the LH image 77 and the LL image 76 shown in FIG. 7 to generate thereby the L image 73. Through this processing, the number of pixels in the vertical direction becomes double that of the pre-synthesized image.

The horizontal inverted DWT sections 1213 and 1223 apply the inverse wavelet transform in the horizontal direction with respect to the H and L images that have been generated by the aforementioned vertical inverted DWT sections 1211, 1221, 1212, and 1222 to generate thereby a synthesized image. In other words, this corresponds to processing for synthesizing the L image 73 and the H image 72 shown in FIG. 7 to generate thereby a synthesized image 71. If this synthesized image has been synthesized by the (j+1)th frequency component synthesis section, this becomes an LL image to be input to the jth frequency component synthesis section. An image that has been synthesized in the first frequency component synthesis section becomes an output image. As described above, the frequency component synthesis section 120 performs synthesis processing in the reverse order of the resolution processing performed by the frequency component resolution section 110.

A specific calculation example in frequency synthesis processing will be described with reference to FIG. 7. The HH image 79 ($\omega_{n,m}^{(2,d)}$) that has been resolved in the second frequency component resolution section 112 and the HL image 78 ($\omega_{n,m}^{(2,v)}$) that has been resolved in the second frequency component resolution section 112 and compensated by the correction section 123 to be described below are input to the vertical inverted DWT section 1211. The H image ($\omega_{n,m}^{(2')}$) is synthesized in the calculation shown in Formula (8). Through this synthesis processing, the number of pixels in the vertical direction becomes double that of the pre-synthesized image.

[Formula 8]

$$\begin{aligned}
\omega_{1,1}^{(2')} &= p_0\omega_{1,1}^{(2,v)} + q_0\omega_{1,1}^{(2,d)} + p_2\omega_{4,1}^{(2,v)} + q_2\omega_{4,1}^{(2,d)} \\
\omega_{2,1}^{(2')} &= p_1\omega_{1,1}^{(2,v)} + q_1\omega_{1,1}^{(2,d)} + p_3\omega_{4,1}^{(2,v)} + q_3\omega_{4,1}^{(2,d)} \\
\omega_{3,1}^{(2')} &= p_0\omega_{2,1}^{(2,v)} + q_0\omega_{2,1}^{(2,d)} + p_2\omega_{1,1}^{(2,v)} + q_2\omega_{1,1}^{(2,d)} \\
\omega_{4,1}^{(2')} &= p_1\omega_{2,1}^{(2,v)} + q_1\omega_{2,1}^{(2,d)} + p_3\omega_{1,1}^{(2,v)} + q_3\omega_{1,1}^{(2,d)} \\
&\vdots \\
\omega_{2n-1,m}^{(2')} &= p_0\omega_{n,m}^{(2,v)} + q_0\omega_{n,m}^{(2,d)} + p_2\omega_{n-1,m}^{(2,v)} + q_2\omega_{n-1,m}^{(2,d)} \\
\omega_{2n,m}^{(2')} &= p_1\omega_{n,m}^{(2,v)} + q_1\omega_{n,m}^{(2,d)} + p_3\omega_{n-1,m}^{(2,v)} + q_3\omega_{n-1,m}^{(2,d)} \\
&\vdots
\end{aligned}$$

Formula (8)

An image 710 ($s_{n,m}^{(2)}$) that has been synthesized and output by the third frequency component synthesis section is input to the vertical inverted DWT section 1212 as the LL image. The LH image 711 ($\omega_{n,m}^{(2,h)}$) that has been resolved in the second frequency component resolution section 112 and compensated by the correction section 123 to be described below is also input thereto. The L image ($s_{n,m}^{(2')}$) is generated by calculation shown in Formula (9). Through this synthesis processing, the number of pixels in the vertical direction becomes double that of the pre-synthesized image.

[Formula 9]

$$\begin{aligned}
s_{1,1}^{(2')} &= p_0 s_{1,1}^{(2)} + q_0\omega_{1,1}^{(2,h)} + p_2 s_{4,1}^{(2)} + q_2\omega_{4,1}^{(2,h)} \\
s_{2,1}^{(2')} &= p_1 s_{1,1}^{(2)} + q_1\omega_{1,1}^{(2,h)} + p_3 s_{4,1}^{(2)} + q_3\omega_{4,1}^{(2,h)} \\
s_{3,1}^{(2')} &= p_0 s_{2,1}^{(2)} + q_0\omega_{2,1}^{(2,h)} + p_2 s_{1,1}^{(2)} + q_2\omega_{1,1}^{(2,h)} \\
s_{4,1}^{(2')} &= p_1 s_{2,1}^{(2)} + q_1\omega_{2,1}^{(2,h)} + p_3 s_{1,1}^{(2)} + q_3\omega_{1,1}^{(2,h)} \\
&\vdots \\
s_{2n-1,m}^{(2')} &= p_0 s_{n,m}^{(2)} + q_0\omega_{n,m}^{(2,h)} + p_2 s_{n-1,m}^{(2)} + q_2\omega_{n-1,m}^{(2,h)} \\
s_{2n,m}^{(2')} &= p_1 s_{n,m}^{(2)} + q_1\omega_{n,m}^{(2,h)} + p_3 s_{n-1,m}^{(2)} + q_3\omega_{n-1,m}^{(2,h)} \\
&\vdots
\end{aligned}$$

Formula (9)

The H image ($\omega_{n,m}^{(2')}$) that has been synthesized in the vertical inverted DWT section 1211 and the L image ($s_{n,m}^{(2')}$) that has been synthesized in the vertical inverted DWT section 1212 are input to the horizontal inverted DWT section 1213. The synthesized image 76 ($s_{n,m}^{(1)}$) is generated by the calculation shown in Formula (10). Through this synthesis processing, the number of pixels in the vertical direction becomes double that of the pre-synthesized image.

[Formula 10]

$$\begin{aligned}
s_{1,1}^{(1)} &= p_0 s_{1,1}^{(2')} + q_0\omega_{1,1}^{(2')} + p_2 s_{4,1}^{(2')} + q_2\omega_{4,1}^{(2')} \\
s_{2,1}^{(1)} &= p_1 s_{1,1}^{(2')} + q_1\omega_{1,1}^{(2')} + p_3 s_{4,1}^{(2')} + q_3\omega_{4,1}^{(2')} \\
s_{3,1}^{(1)} &= p_0 s_{2,1}^{(2')} + q_0\omega_{2,1}^{(2')} + p_2 s_{1,1}^{(2')} + q_2\omega_{1,1}^{(2')} \\
s_{4,1}^{(1)} &= p_1 s_{2,1}^{(2')} + q_1\omega_{2,1}^{(2')} + p_3 s_{1,1}^{(2')} + q_3\omega_{1,1}^{(2')} \\
&\vdots \\
s_{2n-1,m}^{(1)} &= p_0 s_{n,m}^{(2')} + q_0\omega_{n,m}^{(2')} + p_3 s_{n-1,m}^{(2')} + q_2\omega_{n-1,m}^{(2')} \\
s_{2n,m}^{(1)} &= p_1 s_{n,m}^{(2')} + q_1\omega_{n,m}^{(2')} + p_3 s_{n-1,m}^{(2')} + q_3\omega_{n-1,m}^{(2')} \\
&\vdots
\end{aligned}$$

Formula (10)

With the above procedures, the second frequency component synthesis section 121 performs the synthesis of the image $s_{n,m}^{(2)}$ (n,m=1 to 4) that has been synthesized and output by the third frequency component synthesis section and three high frequency images $\omega_{n,m}^{(2,d)}$, $\omega_{n,m}^{(2,v)}$, and $\omega_{n,m}^{(2,h)}$ (n,m=1 to 4) that has been resolved in the second frequency component resolution section 112. As a result of synthesis, the synthesized image $s_{n,m}^{(1)}$ (n,m=1 to 8) of which the number of pixels both in the horizontal direction and vertical direction has been increased twice is generated. This synthesized image $s_{n,m}^{(1)}$ becomes the LL image to be input to the first frequency component synthesis section 122.

The first frequency component synthesis section 122 performs a calculation similar to that mentioned above with respect to the aforementioned $s_{n,m}^{(1)}$ (n,m=1 to 8) and $\omega_{n,m}^{(1,d)}$, $\omega_{n,m}^{(1,v)}$, and $\omega_{n,m}^{(1,h)}$ (n,m=1 to 8) that have been resolved in the first frequency component resolution section 111. As a result, the synthesized image $s_{n,m}^{(0)}$ (n,m=1 to 16) is generated. This synthesized image $s_{n,m}^{(0)}$ is a corrected image of an input image to the image processing section.

Next, correction processing performed by the correction section will be specifically described with reference to the processing of the LH image as an example.

Figure 9:
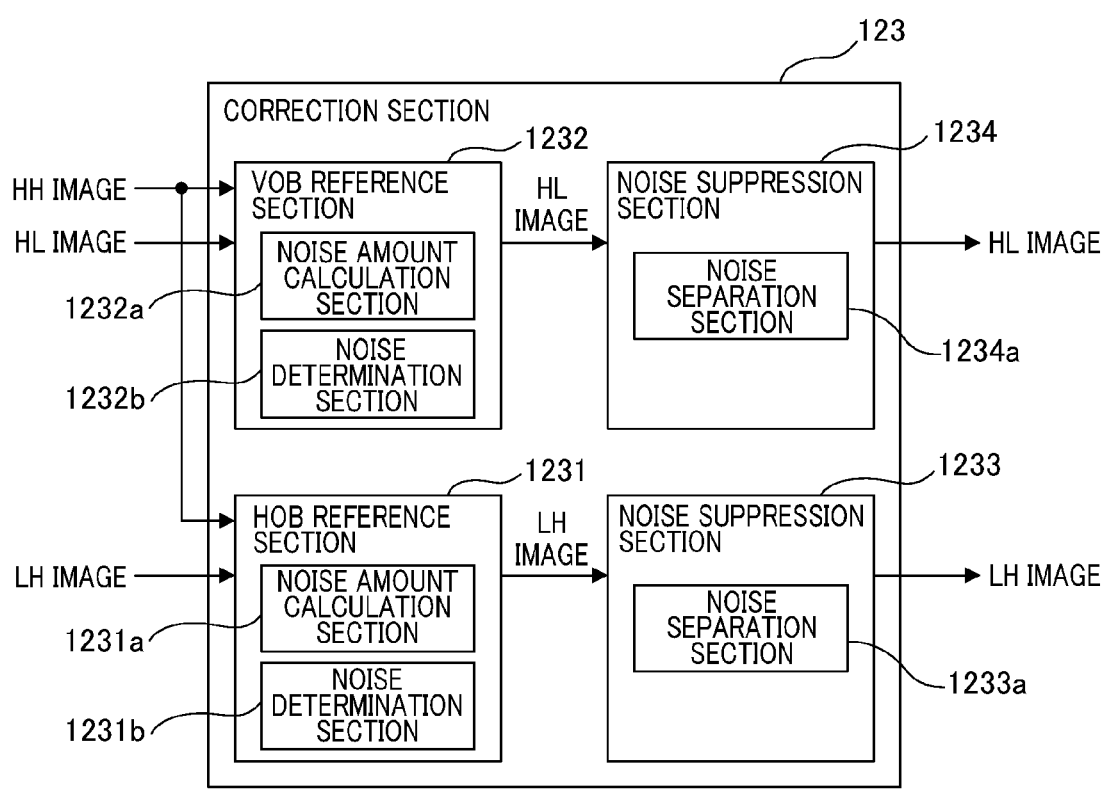
FIG. 9 is a block diagram showing a configuration of a correction section 123.

The correction sections 123, 124, etc. are provided in correspondence with the first frequency component synthesis section 121, the second frequency component synthesis section 122, etc., respectively. The HL, LH and HH images are input to the correction sections 123, 124, etc. provided within the frequency component synthesis sections. Among them, the correction sections 123, 124, etc. perform pattern noise suppression processing on the HL and LH images. FIG. 9 is a block diagram showing a configuration of the correction section 123. The correction section 123 includes an HOB reference section 1231, a VOB reference section 1232, and noise suppression sections 1233 and 1234.

The HOB reference section 1231 includes a noise amount calculation section 1231a. The noise amount calculation section 1231a calculates pattern noise component amounts for the respective rows corresponding to frequency bands from the wavelet expansion coefficient for the HOB section of the input LH image and the details of which will be described later. The HOB reference section 1231 also includes a noise determination section 1231b. The noise determination section 1231b determines whether or not there is any pattern noise from the noise component amount calculated by the noise amount calculation section 1231a. The row for which it has been determined that noise has occurred is subjected to the noise suppression processing performed by a noise suppression section 1233 to be described below.

The VOB reference section 1232 includes a noise amount calculation section 1232a. The noise amount calculation section 1232a calculates pattern noise component amounts for the respective columns corresponding to frequency bands from the wavelet expansion coefficient for the VOB section of the input HL image. The VOB reference section 1232 also includes a noise determination section 1232b. The noise determination section 1232b determines whether or not there is any pattern noise from the noise component amount calculated by the noise amount calculation section 1232a. The column for which it has been determined that noise has occurred is subjected to the noise suppression processing performed by a noise suppression section 1234 to be described below. This processing enables the compensating of any row or column only where pattern noise occurs.

The noise suppression sections 1233 and 1234 perform noise suppression processing with respect to any row or column for which it has been determined that noise has occurred at the HOB reference section 1231 or the VOB reference section 1232. The noise suppression sections 1233 and 1234 include the noise separation sections 1233a and 1234a, respectively. The noise separation sections 1233a and 1234a also serve as a threshold value determination section that determines a threshold value for separating the object component and noise component at the effective section from the pattern noise component amount calculated by the noise amount calculation sections 1231a and 1232a, respectively. The noise separation sections 1233a and 1234a separate the object component and pattern noise component using the determined threshold value. The noise suppression sections 1233 and 1234 multiply the wavelet expansion coefficient by the correction coefficient so as to suppress the pattern noise component only that has been separated by the noise separation sections 1233a and 1234a and the details of which will be described later.

Figure 10A:
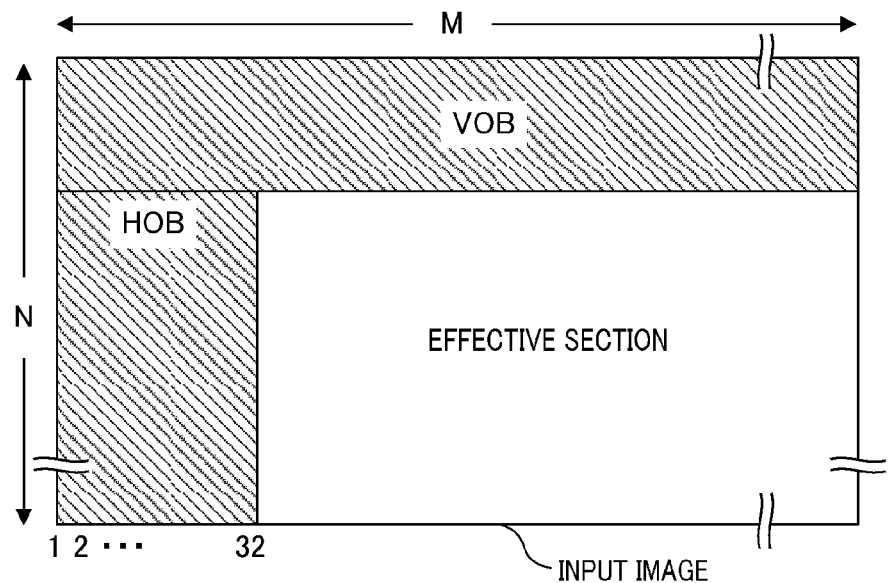
FIGS. 10A and 10B are diagrams illustrating correction processing.
Figure 10B:
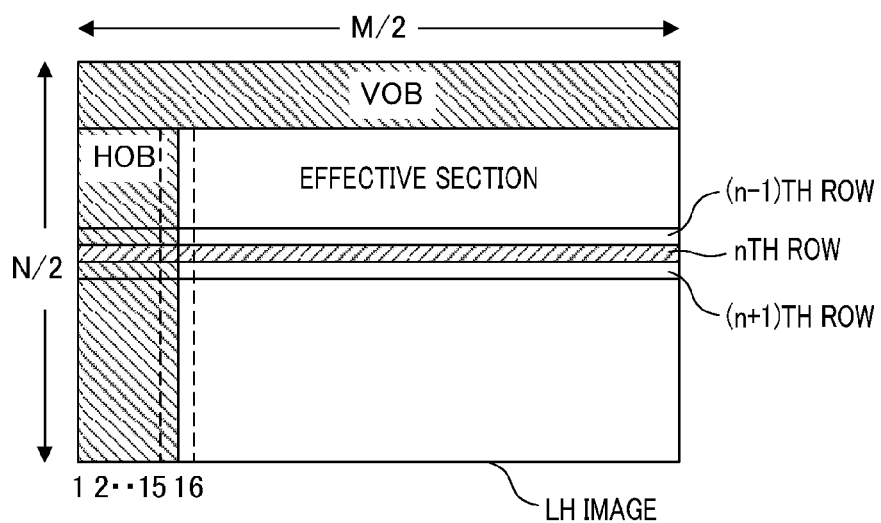

Correction processing performed by the correction section 123 will be specifically described with reference to processing on the LH image as an example. FIG. 10 is a diagram illustrating correction processing. FIG. 10A shows an example of an input image. In the example in FIG. 10A, assume that the number of pixels is represented by N in the vertical direction and M in the horizontal direction. In this image, the 1st to 32nd columns at the left end are HOB. This input image is input to the first frequency component resolution section 111 to generate an LH image by frequency resolution (resolution level 1). Such an LH image is shown in FIG. 10B. In the aforementioned LH image, the number of pixels is reduced to ½ that of the pre-resolved image for each column and row. Hence, HOB in the LH image corresponds to the 1st to 16th columns at the left end. It should be noted, however, that from a calculation using Formula (2), the 16th column includes both components of the HOB section and the effective section. When the values (wavelet expansion coefficient) in the (n−1)th row and the nth row of the LH image are extracted to calculate thereby the respective absolute values, the respective absolute values are shown in FIGS. 11A and B

FIG. 11 shows the absolute value of the wavelet expansion coefficient of the row in which pattern noise is present in the LH image (FIG. 11B); and in which pattern noise does not occur in the LH image (FIG. 11A). Pattern noise component is included in both the effective section and the light-shielded HOB section (as seen in FIG. 11B), while an object edge component (shown in FIG. 11A on its own) is included only in the effective section. Hence, by calculating the average ave(n) of the absolute values of the wavelet expansion coefficients for the respective rows in the HOB section at the noise amount calculation section, pattern noise component amounts for the respective rows corresponding to the respective frequency bands can be calculated, where n represents the number of rows.

However, within the HOB, the range of columns used for the calculation of the average ave(n) is different depending on frequency bands. FIG. 10A is an example of an input image. In the LH image of level 1 that has been resolved in the first frequency component resolution section, the 1st to 16th columns at the left end correspond to HOB and the 1st to 15th columns except for the 16th column in which a component of the effective section is included are used to calculate thereby the average ave(n). In the LH image of level 2, the 1st to 8th columns at the left end correspond to HOB and the 1st to 7th columns except for the 8th column, in which a component of the effective section is included, are used. Likewise, in the LH image of level 3, the 1st to 3rd columns at the left end are used. In this way, the range of columns in HOB is reduced by half as the resolution level is increased. Among the reduced columns, except for pixels in which a component of the effective section is included, the range of columns is used to calculate the ave(n).

As shown in FIG. 11A, when the calculated average ave(n) is below a predetermined noise determination reference value, the noise determination section 1231b determines that there is no pattern noise in that row. Thus, the noise suppression section 1233 does not perform noise suppression processing with respect to that row. On the other hand, as shown in FIG. 11B, when the average ave(n) is above the aforementioned noise determination reference value, the noise determination section 1231b determines that pattern noise is present in that row. Thus, the noise suppression section 1233 performs noise suppression processing. Here, the noise determination reference value may be a fixed value, or may be a separate value for each correction section of each frequency band. A value calculated from the HH image, i.e., a diagonal direction high frequency component subjected to frequency resolution, may also be used. The details of this will be described in the second embodiment.

Next, the processing in the noise suppression section 1233 will be described. The noise suppression section 1233 performs noise suppression processing on the row determined by the noise determination section 1231b of the HOB reference section 1231 to have pattern noise. The effective section of the row for which it has been determined that noise has occurred includes an edge component and pattern noise component of the object. Since the amplitude of pattern noise is smaller than the signal level of the object in the effective section, the pattern noise component of the absolute values of the wavelet expansion coefficients subjected to frequency transform is smaller than the object edge component. Therefore, the value Wth(n) obtained from the average ave(n), calculated at the aforementioned HOB section, multiplied by a predetermined coefficient taking account of fluctuations in the expansion coefficient as shown in Formula (11) can be used as a threshold value for separating the pattern noise component and object edge component. The noise separation section 1233a separates the pattern noise component and object edge component using the threshold value. Here, a predetermined coefficient to be multiplied by the ave(n) was 1.1 as an example taking account of the aforementioned fluctuation.

[Formula 11]

$$Wth(n) = ave(n) \times 1.1 \qquad \text{Formula (11)}$$

Figure 12A:
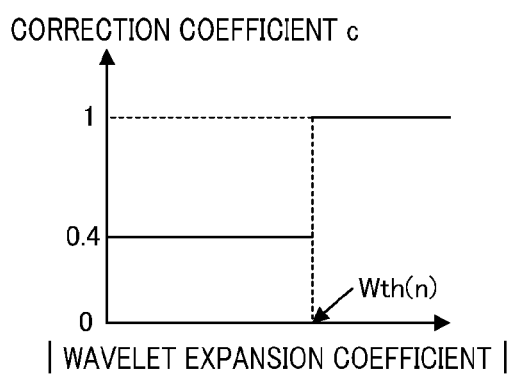
FIGS. 12a to D are views showing a correction coefficient by which the wavelet expansion coefficient is multiplied at the noise suppression section.

Next, the absolute value of the wavelet expansion coefficient in the effective section is calculated per unit pixel. The correction coefficient is multiplied by the wavelet expansion coefficient according to the magnitude of the absolute value of each unit pixel. The correction coefficient is different in values before and after the threshold value Wth(n) as shown in FIG. 12. FIG. 12A is a view showing a correction coefficient by which the wavelet expansion coefficient is multiplied at the noise suppression section. In a unit pixel where the absolute value of the wavelet expansion coefficient in the effective section is less than the threshold value Wth(n), in other words, when the unit pixel is pattern noise component, the correction coefficient c ($0 \leq c \leq 1$) is multiplied by the wavelet expansion coefficient so as to suppress the pattern noise component. The value of the correction coefficient c is, for example, 0.4. In a unit pixel where the absolute value of the wavelet expansion coefficient in the effective section is more than the threshold value Wth(n), in other words, when the unit pixel is the object edge component, the correction coefficient c=1 is multiplied by the wavelet expansion coefficient in order to retain the object edge component.

The aforementioned processing can be summarized as shown in Formula (12), where $\omega_{n,m}^{(j,h)}$ is the wavelet expansion coefficient before correction; and $w'_{n,m}^{(j,h)}$ is the wavelet expansion coefficient after correction. Also, j is a level representing a frequency band, and h is a horizontal direction component.

[Formula 12]

$$\omega'^{(j,h)}_{n,m} = \omega^{(j,h)}_{n,m} \times c \quad c = \begin{cases} 0.4 & |\omega^{(j,h)}_{n,m}| < Wth(n) \\ 1 & |\omega^{(j,h)}_{n,m}| \geq Wth(n) \end{cases} \quad \text{Formula (12)}$$

Figure 12B:
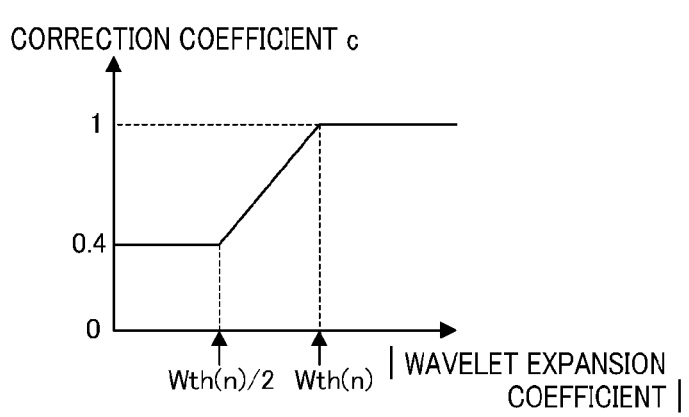

Here, the correction coefficient c used in the case where the absolute value of the aforementioned wavelet expansion coefficient is less than the threshold value Wth(n) may be a fixed value as in the aforementioned example, or may be a separate value for each frequency band. When correction coefficient is discontinuous before and after the threshold value, this discontinuity may affect the outline of the image. The correction coefficient may be changed continuously as shown in FIG. 12B, for example, in order to prevent this adverse effect. In this example, the correction coefficient c is 0.4 when the wavelet expansion coefficient is Wth(n)/2 or less, c is 1 when the coefficient is Wth(n) or more, and c changes linearly between 0.4 and 1 when the coefficient lies between Wth(n)/2 and Wth(n).

Figure 12C:
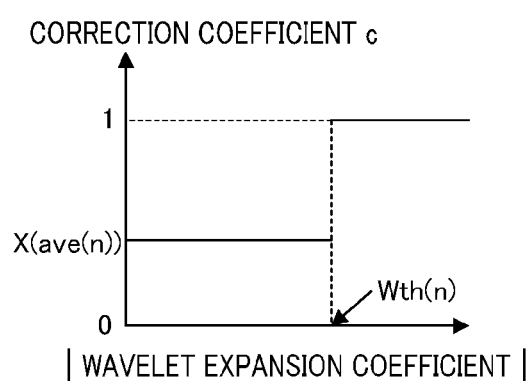
Figure 12D:
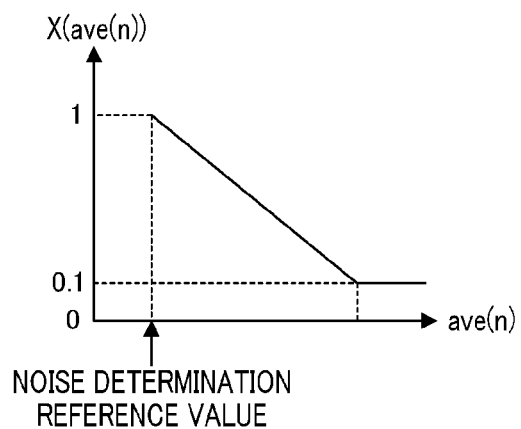

Alternatively, as shown in FIG. 12C, the correction coefficient is set to X(ave(n)) for use when the absolute value of the wavelet expansion coefficient is less than the threshold value Wth(n), so that the correction coefficient may be changed according to the average ave(n) for each row calculated at the HOB section. In this case, the value of X(ave(n)) is set as shown in FIG. 12D, for example. In the example in FIG. 12D, X(ave(n)) (i.e., correction coefficient c) is set to 1 when the pattern noise component ave(n) is equal to the noise determination reference value, the X(ave(n)) linearly decreases as the pattern noise component becomes larger, and its lower limitation is set to 0.1. In other words, any row having a larger pattern noise component has a smaller correction coefficient, whereby a suppression amount of pattern noise component is increased.

The amplitude of pattern noise of a corrected image to be synthesized can be reduced by performing correction processing on the aforementioned LH image. As described previously, when the amplitude of pattern noise is different depending on the horizontal position, offset correction by which the average of OB is subtracted from the effective section may not obtain a sufficient correction effect at a position distant from OB. On the other hand, the correction method according to the present embodiment, which suppresses pattern noise by multiplying the wavelet expansion coefficient by a correction coefficient, reduces the amplitude of pattern noise even when the amplitude of pattern noise is different depending on the horizontal position, whereby a uniform correction effect can be obtained.

Figure 13:
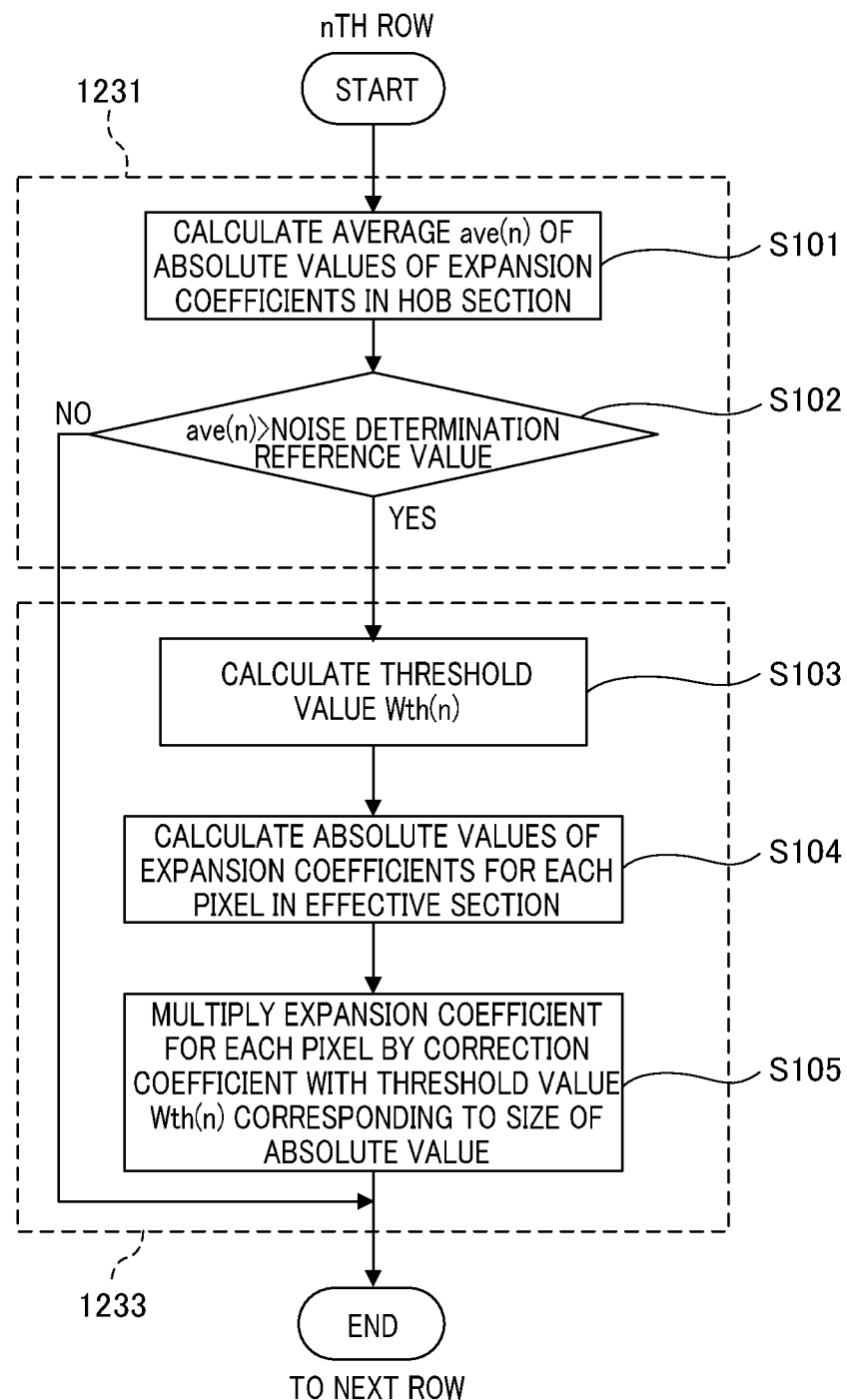
FIG. 13 is a flowchart showing the flow of processing of each row of the LH image carried out by the correction section.

Correction processing (an example of operations of processing on the LH image) carried out by the correction section 123 as described above is summarized using a flowchart. FIG. 13 is a flowchart showing the flow of the processing of each row of the LH image carried out by the correction section. Firstly, the average ave(n) of the absolute values of the expansion coefficients is calculated by the noise amount calculation section 1231a of the HOB reference section 1231 (step (hereinafter referred to as "S") 101).

Next, the noise determination section 1231b compares the ave(n) calculated by the noise amount calculation section 1231a with the pattern noise determination reference value (S102). When the ave(n) is less than the determination reference value and it is determined that there is no pattern noise in that row (S102: No), the noise suppression section does not perform noise suppression processing to end thereby the processing for that row. On the other hand, when the ave(n) is more than the determination reference value (S102: Yes), the noise suppression section 1233 performs noise suppression processing.

The noise separation section 1233a in the noise suppression section 1233 calculates the threshold value Wth(n) for separating pattern noise and an object edge component with respect to the row for which it has been determined that noise has occurred (S103). Next, the absolute value of the expansion coefficient for each pixel in the effective section is calculated (S104). The correction coefficient having the threshold value Wth(n) is multiplied by the wavelet expansion coefficient for each pixel according to the magnitude of the calculated absolute value so as to suppress the pattern noise component (S105). Processing from S101 to S105 is performed for each row. By performing the aforementioned processing in the correction sections in the respective frequency component synthesis sections, only the pattern noise component is suppressed, and the LH image that contains the object edge component is thereby obtained.

Processing carried out by the HOB reference section 1231 and the noise suppression section 1233 with respect to the LH image has been described. When the processing described above is performed for the HL image in the VOB reference section 1232 and the noise suppression section 1234, pattern noise component in the vertical direction can be suppressed.

Figure 14:
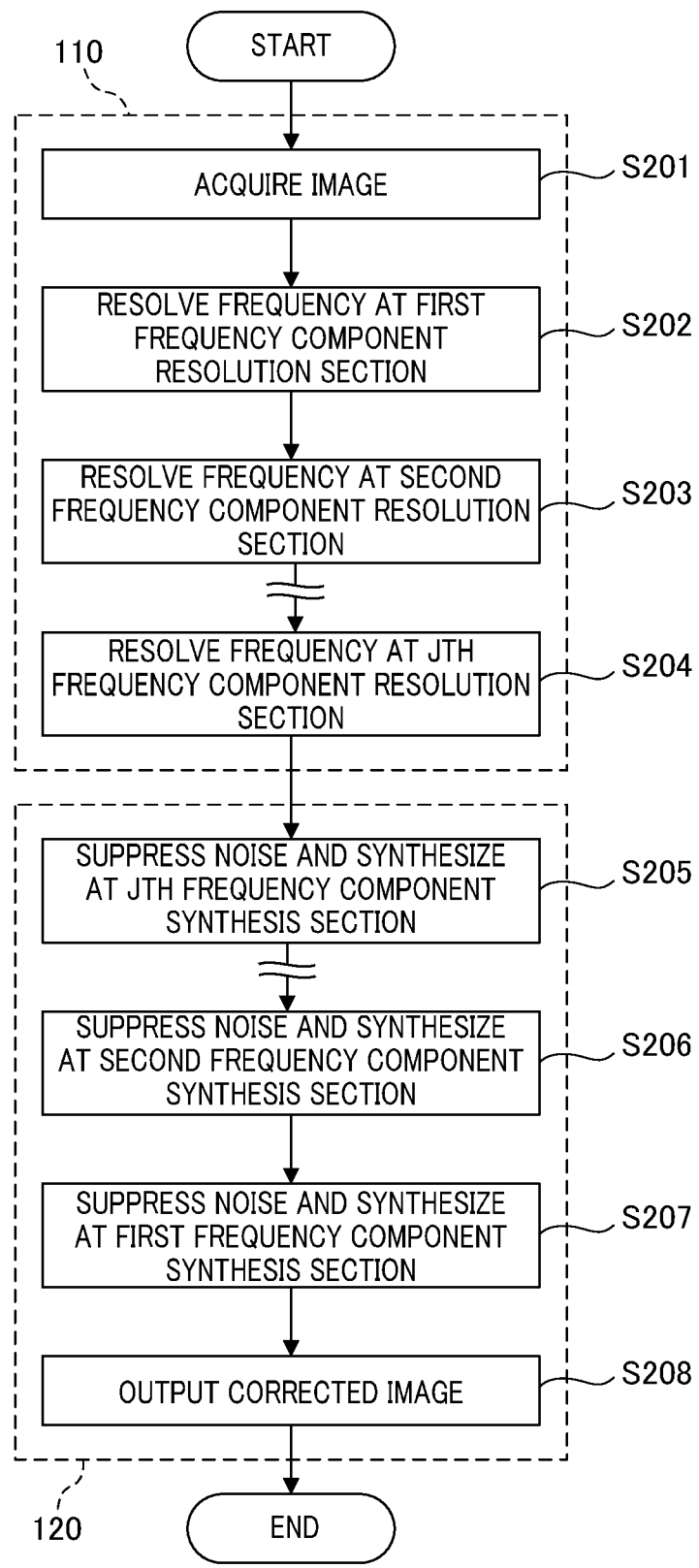
FIG. 14 is an exemplary flowchart showing the noise suppression processing in the image processing section 100.

Next, the flow of the noise suppression processing in the image processing section 100 of the image sensing apparatus of the first embodiment will be described. FIG. 14 is an exemplary flowchart showing the noise suppression processing in the image processing section 100. First, the image processing section 100 acquires an image obtained from the DFE 15 or the like (S201).

Next, this input image is input to the first frequency component resolution section 111 so as to generate high frequency images (HH, HL, and LH images) and a low frequency image (LL image) (S202). This low frequency image (LL image) is input to the second frequency component resolution section 112 so as to likewise generate high frequency images (HH, HL, and LH images) and a low frequency image (LL image) (S203). Likewise, the low frequency image (LL image) generated in the second frequency component resolution section is input to the third frequency component resolution section for further resolution. This processing is repeated until a predetermined resolution level is achieved (S204).

The high frequency images (HH, HL, and LH images) and low frequency image (LL image) that have been resolved in the jth frequency component resolution section, i.e., the highest resolution level, are input to the jth frequency component synthesis section. Among these four images, the HL and LH images are noise-suppressed by the correction section. The HH and LL images and the noise-suppressed HL and LH images are then frequency-synthesized so as to generate a synthesized image (S205).

This synthesized image is input to the (j−1)th frequency component synthesis section as the LL image together with the HH, HL, and LH images generated in the (j−1)th frequency component resolution section so as to output a synthesized image by the frequency synthesis processing described above. By repeating the aforementioned processing, an image is synthesized in the reverse order of the resolution processing. In the operation of the noise suppression performed in S205 described above and the operations in S206 and S207 shown in the following, the noise suppression operation described previously with reference to FIG. 13 is performed.

The image (LL image) that has been synthesized in the third frequency component synthesis section and the HH, HL, and LH images that have been resolved in the third frequency component resolution section are input to the second frequency component synthesis section 121. The HL and LH images are noise-suppressed in the correction section and then synthesized together with the HH and LL images (S206).

The synthesized image (LL image) that has been generated in the second frequency component synthesis section 121 and the HH, HL, and LH images that have been resolved in the second frequency component resolution section 112 are input to the first frequency component synthesis section 122. The HL and LH images that have been noise-suppressed in the correction section and the HH and LL images are then frequency-synthesized so as to generate a synthesized image (S207). This image is a corrected image with its pattern noise being suppressed with respect to the input image and is output from the image processing section (S208). The input image may be an image for each color band, namely, R, Gb, Gr, and B, subjected to Bayer separation. In this case, each of the processes shown in FIG. 14 may be performed for each of the four images.

As described above, in the first embodiment, each of the frequency component resolution sections sequentially resolves an input image into the HH, HL, LH, and LL images for each frequency band. The pattern noise components for the respective HL and LH images are suppressed in the correction section so as to sequentially synthesize each image that has been resolved by the frequency component synthesis section, whereby a corrected image in which pattern noise is suppressed only in a portion where pattern noise exists can be obtained.

(Second Embodiment)

Figure 15:
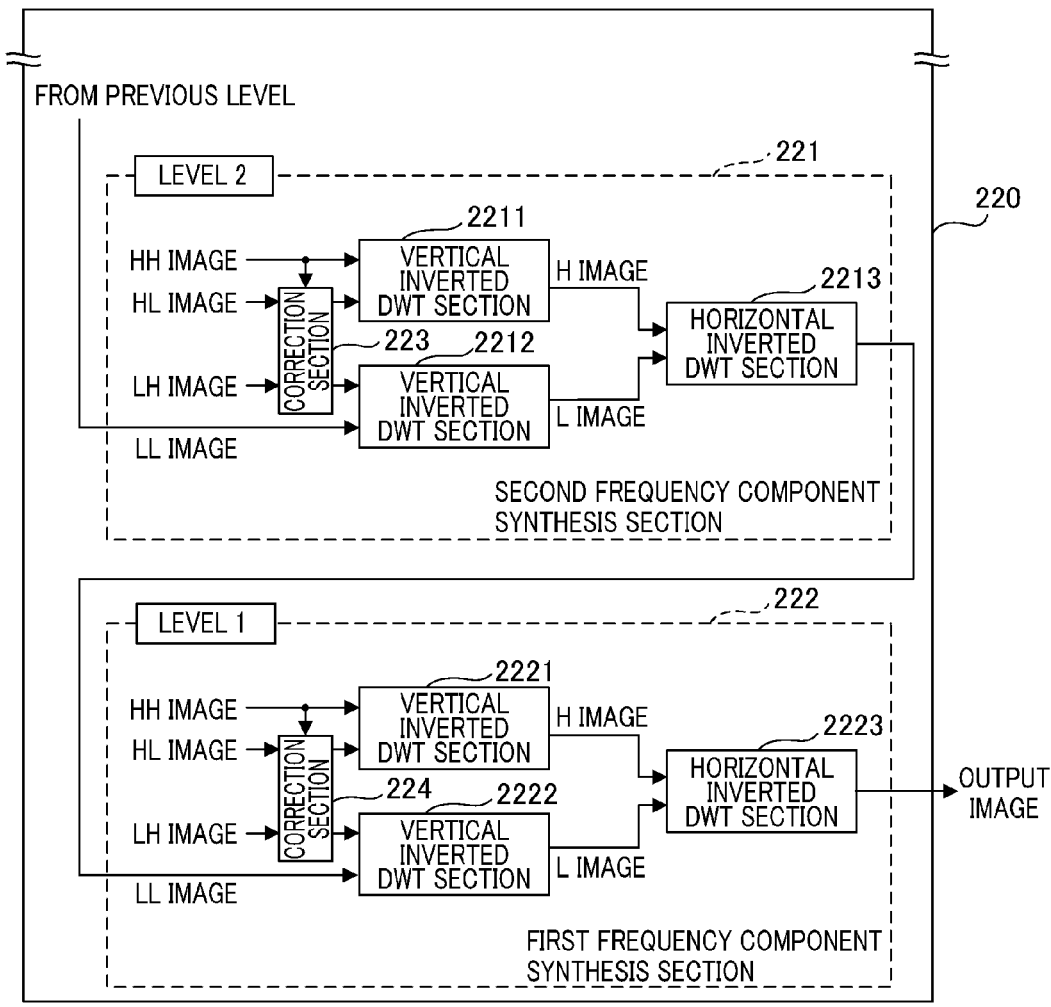
FIG. 15 is a functional block diagram showing an example of the circuit configuration of a frequency component synthesis section 220 of the second embodiment.

The second embodiment is the same as the first embodiment except that the frequency component synthesis section 220 which performs an operation different from that of the frequency component synthesis section 120 is provided in place of the frequency component synthesis section 120. Hence, the portions which have the same function as those of the above-described first embodiment are denoted by the same reference numerals as in the first embodiment, and the redundant description thereof is appropriately omitted. FIG. 15 is a functional block diagram showing an example of the circuit configuration of the frequency component synthesis section 220 of the second embodiment. The frequency component synthesis section 220 includes first and second frequency component synthesis sections 221 and 222 that contain the vertical inverted DWT sections 2211, 2212, 2221, 2222, and so on and the horizontal inverted DWT sections 2213, 2223, and so on. Each of these has the same function as that of the vertical inverted DWT sections 1211, 1212, 1221, 1222 and the like and the horizontal inverted DWT sections 1213, 1223, and the like of the first embodiment. The frequency component synthesis section 220 also includes the correction sections 223, 224, and so on. The HL, LH, and HH images that have been generated in each frequency component resolution section are input to the correction sections 223, 224, and so on.

Figure 16:
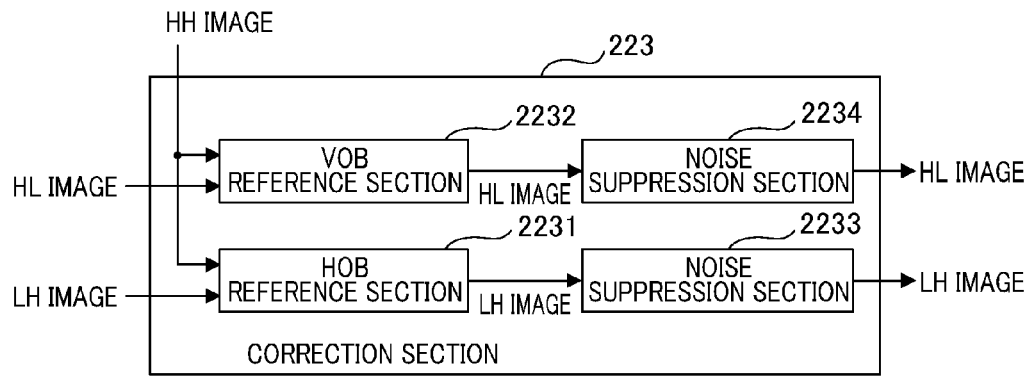
FIG. 16 is a block diagram showing a configuration of a correction section 223.

FIG. 16 is a block diagram showing a configuration of the correction section 223. The correction section 223 includes an HOB reference section 2231, a VOB reference section 2232 and noise suppression sections 2233 and 2234. As in the first embodiment, the HOB reference section 2231 and the VOB reference section 2232 both include a noise amount calculation section and a noise determination section (both not shown). As in the first embodiment, the noise suppression sections 2233 and 2234 also both include a noise separation section (not shown).

The HH image that has been input to the correction section 223 is input to the HOB reference section 2231 and the VOB reference section 2232. The HOB reference section 2231 calculates the average of the absolute values of the expansion coefficients for the HOB section of the HH image. The VOB reference section 2232 calculates the average of the absolute values of the expansion coefficients for the VOB section of the HH image. These averages multiplied by a predetermined coefficient (for example, 1.1) are the noise determination reference values of the HOB reference section 2231 and the VOB reference section 2232, respectively. Correction processing with respect to the HL and LH images using these noise determination reference values is the same as that described with reference to the flowchart of FIG. 13 in the first embodiment.

In the first embodiment, a predetermined fixed value is used as a noise determination reference value for determining whether or not any pattern noise is generated for each row or each column in the HOB reference section 1231 or the VOB reference section 1232, which are both provided within the correction section. In contrast, according to the second embodiment, the noise determination reference value is calculated from the average of the absolute values of the expansion coefficients for the HOB section or the VOB section of the HH image, which is a diagonal direction high frequency component generated in each frequency component resolution section. Random noise is included in both the OB section and the effective section of an image shot using an image sensor. Substantially the same amount of random noise is included with respect to high frequency components HH, HL, and LH for all frequency bands resolved by the frequency component resolution section. Among them, since the HH image does not contain a pattern noise component in the horizontal or vertical direction, the HOB section of the HH image only contains a random noise component.

For example, when no pattern noise in the horizontal direction occurs, the absolute value of the expansion coefficient for the HOB of the LH image is substantially the same as that of the HH image. On the contrary, when pattern noise in the horizontal direction occurs, the absolute value of the expansion coefficient of only the row among the HOB section of the LH image, in which pattern noise is present, is greater than that of the HOB section of the HH image. Hence, a value calculated from the average of the absolute values of the expansion coefficients in the HOB section or the VOB section of the HH image can be used as the noise determination reference value for determining the presence or absence of pattern noise in the LH and HL images.

In this way, in the second embodiment, a value calculated from the average of the absolute values of the expansion coefficients in the HOB section or the VOB section of the HH image is used as the noise determination reference value for determining the presence or absence of pattern noise in the LH and HL images. Consequently, pattern noise-occurring conditions can be accurately determined regardless of the magnitude of random noise, and the image quality after the noise suppression can thereby be improved.

(Third Embodiment)

Figure 17:
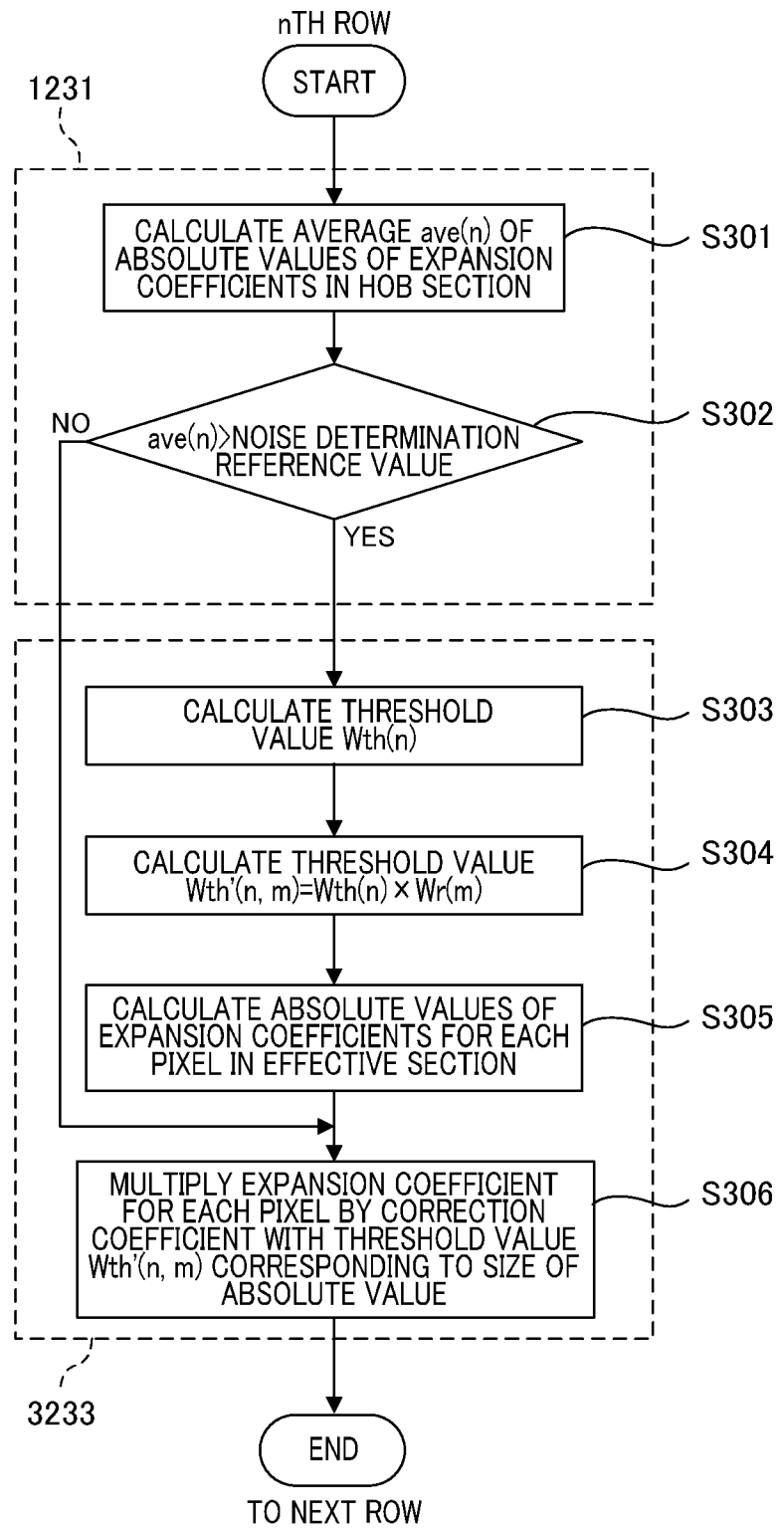
FIG. 17 is a flowchart showing the flow of processing of each row of the LH image to be carried out by the correction section in the third embodiment.

The third embodiment is the same as the first embodiment except that a noise suppression section 3233 (corresponding to 2233 of FIG. 16) which performs an operation different from that of the noise suppression sections 1233 and 1234 in the first embodiment is provided in place of the noise suppression sections 1233 and 1234. Hence, the portions which have the same function as those of the above-described first embodiment are denoted by the same reference numerals as in the first embodiment, and the redundant description thereof is appropriately omitted. FIG. 17 is a flowchart showing the flow of the processing of each row of the LH image to be carried out by the correction section in the third embodiment. FIG. 17 corresponds to FIG. 13 of the first embodiment. The operation of the present embodiment is different from the operation of the first embodiment in that the intensity ratio Wr(m) is used in S304 and S306. Otherwise, S301 to S303 correspond to S101 to S103. Here, the intensity ratio Wr(m) will be described.

As described earlier, since the power supply and GND for each pixel within the CMOS image sensor are shared, pattern noise in the horizontal direction occurs if the power supply and the GND for these pixels fluctuates temporally. Since the wiring length from the power supply and the GND for each pixel is different depending on a position at which the power supply and the GND provided within the image sensor are arranged, the impedance of the wire is also different depending on the pixel. Hence, pixels in a position distant from the power supply and the GND cause an impedance increase in the wire, whereby the influence of the fluctuations in the power supply and the GND becomes stronger. Consequently, the pattern noise intensity also increases at a position more distant from the power supply and the GND. For example, when the power supply and the GND are supplied from the left side of the image sensor, the pattern noise intensity increases at the right side of the pixels.

In the case of pattern noise having a different intensity depending on a horizontal position, which occurs due to the positions at which the power supply and GND are arranged, the intensity ratio is determined by the distance from the power supply and the GND, and thus the ratio is a fixed value. Accordingly, by shooting a light-shielded image in the manufacturing process of the image sensor, determining the intensity ratio depending on the horizontal position of pattern noise from the shot image, and using the intensity ratio in the correction section, pattern noise having an intensity that differs depending on the aforementioned horizontal position can be corrected. In this particular embodiment, this intensity ratio is represented as the intensity ratio Wr(m).

Next, the method for calculating the intensity ratio Wr(m) will be described. An image shot in a light-shielded state in the manufacturing process is resolved into the HH, LH, HL, and LL images for each frequency band by the frequency component resolution section 110 shown in FIG. 6 of the first embodiment. When the intensity depending on the horizontal position of pattern noise is corrected, the absolute value of the LH image for each resolved frequency band is taken so as to extract a maximum value for each column. Intensity difference depending on the horizontal position of pattern noise appears on a graph of an extracted maximum value for each column.

Figure 18A:
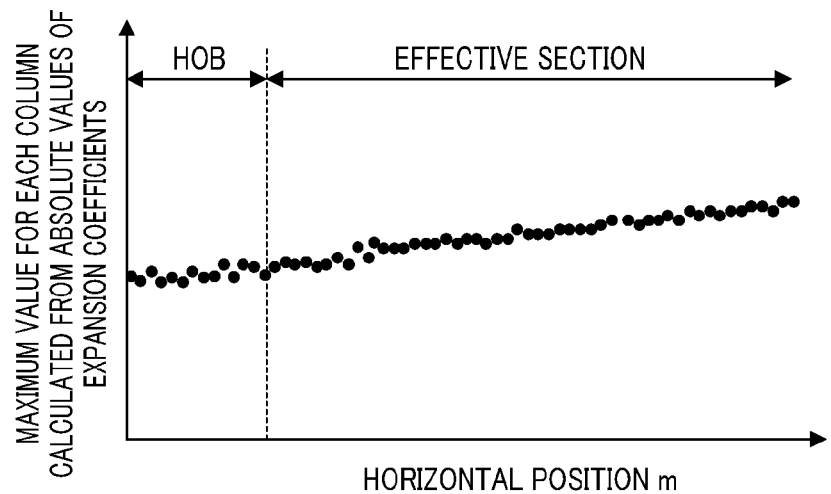
FIGS. 18A and 18B are views showing how to calculate the intensity ratio Wr(m).
Figure 18B:
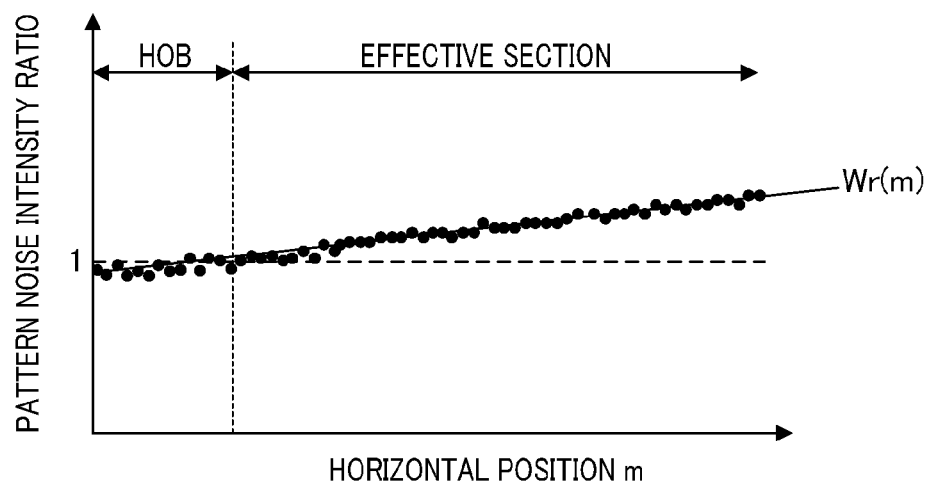

FIG. 18 is a view showing how to calculate the intensity ratio Wr(m). FIG. 18A is a graph of an extracted maximum value for each column calculated from the absolute value of the expansion coefficient of the LH image that has been resolved by the first frequency component resolution section 111. The horizontal axis of FIG. 18 denotes the horizontal position of the image sensor, which is shown corresponding to the position of the image sensor in the left-right direction. When the power supply and the GND are supplied from the left side of the image sensor, the expansion coefficient of the pattern noise component becomes greater closer to the right-side area of the image sensor as shown in FIG. 18A. FIG. 18B is a graph showing the entire maximum value data for each column divided by the calculated average of the HOB section. FIG. 18B shows the intensity ratio in the horizontal position on the basis of the pattern noise intensity in the HOB section. The intensity ratio is calculated for each frequency band so as to determine the function Wr(m) in which the intensity ratios fit a linear or polynomial equation. This is the intensity ratio Wr(m) to be used for correcting an intensity difference that depends on the horizontal position of pattern noise, provided that m is a horizontal position. Data of the intensity ratio shown in FIG. 18B may be used as it is in place of the intensity ratio Wr(m).

Referring back to FIG. 17, the operation of the correction section of the present embodiment will be described. Steps from S301 to S303 are the same as those from S101 to S103 shown in FIG. 13 of the first embodiment. In S304, instead of the threshold value Wth(n), Wth'(n, m) obtained from the threshold value Wth(n) multiplied by the intensity ratio Wr(m) is calculated as a threshold value for separating a pattern noise component and an object edge component. Step S305 is the same as S104 shown in FIG. 13 of the first embodiment. In S306, a pattern noise component and an object edge component are separated using the threshold value Wth'(n, m) depending on the magnitude of the calculated absolute value, and a correction coefficient having the threshold value Wth'(n, m) is multiplied by the expansion coefficient for each pixel, whereby a pattern noise component is suppressed.

Figure 19:
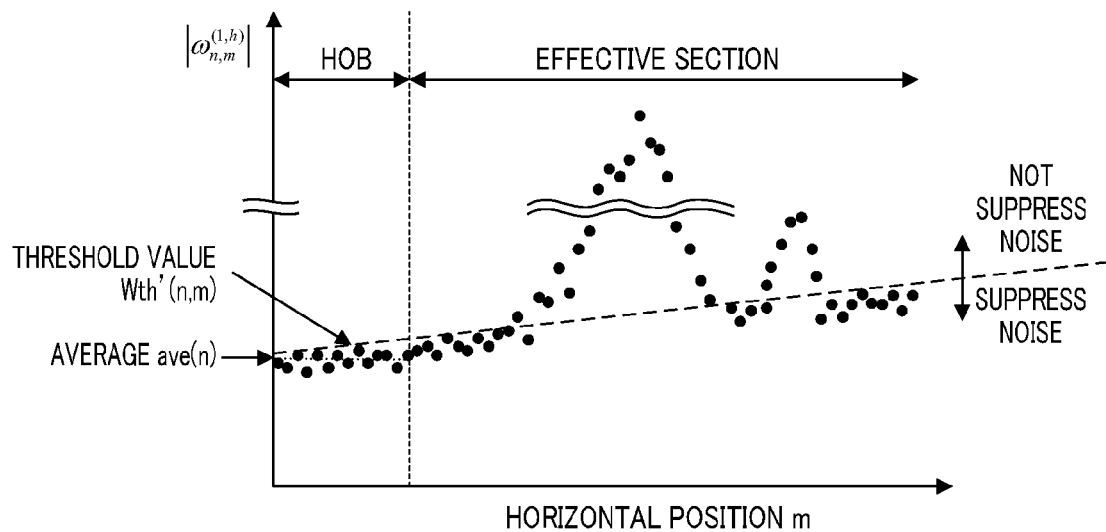
FIG. 19 is a view showing the absolute value and the threshold value Wth'(n, m) of the expansion coefficient of the row, in which pattern noise is present, of the LH image when pattern noise having an intensity difference occurs depending on its horizontal position.

FIG. 19 is a view showing the absolute value and the threshold value Wth'(n, m) of the expansion coefficient of the row, in which pattern noise is present, of the LH image when pattern noise having an intensity difference occurs depending on its horizontal position. By setting Wth'(n, m), which is a function of n and m, as a threshold value using the intensity ratio Wr(m) that has been calculated in advance, a portion having a larger pattern noise intensity has a higher threshold value. Hence, even if pattern noise has different intensities depending on the horizontal position, a pattern noise component can be accurately separated from an object edge component. Instead of Formula (12), a correction coefficient to be multiplied by the expansion coefficient in S105 as shown in FIG. 13 of the first embodiment is also set as Formula (13) using the intensity ratio Wr(m).

[Formula 13]

$$\omega'^{(j,h)}_{n,m} = \omega^{(j,h)}_{n,m} \times c \quad c = \begin{cases} \dfrac{0.4}{Wr(m)} & |\omega^{(j,h)}_{n,m}| < Wth'(n, m) \\ 1 & |\omega^{(j,h)}_{n,m}| \geq Wth'(n, m) \end{cases} \quad \text{Formula (13)}$$

Figure 20:
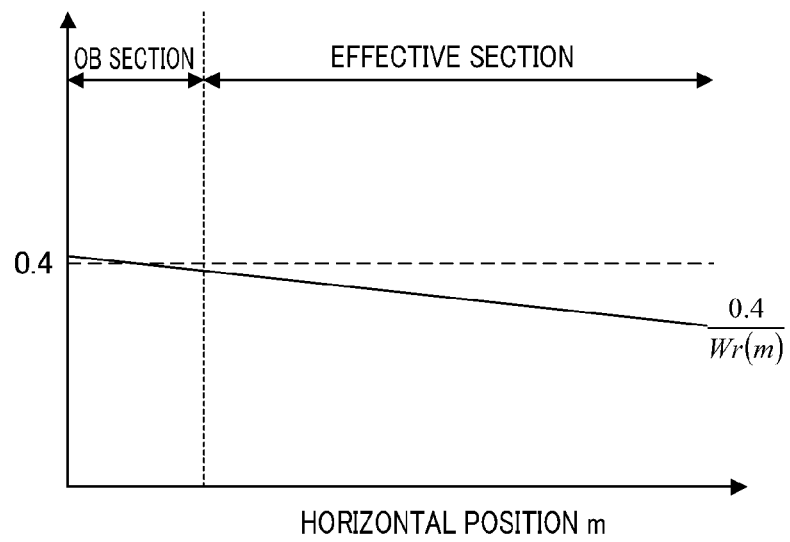
FIG. 20 is a view showing a correction coefficient divided by the intensity ratio Wr(m).

A component for which the absolute value of the expansion coefficient smaller than the threshold value Wth'(n, m), that is, a correction coefficient to be multiplied by a pattern noise component is divided by the intensity ratio Wr(m). FIG. 20 is a view showing a correction coefficient divided by the intensity ratio Wr(m). In the example in FIG. 20, the intensity ratio Wr(m) used is the one shown in FIG. 18B. By decreasing the correction coefficient at a portion where the pattern noise intensity is large, the noise suppression amount is increased.

By doing so, accurate correction can be achieved even for the pattern noise having an intensity difference depending on the horizontal position.

(Fourth Embodiment)

Figure 21:
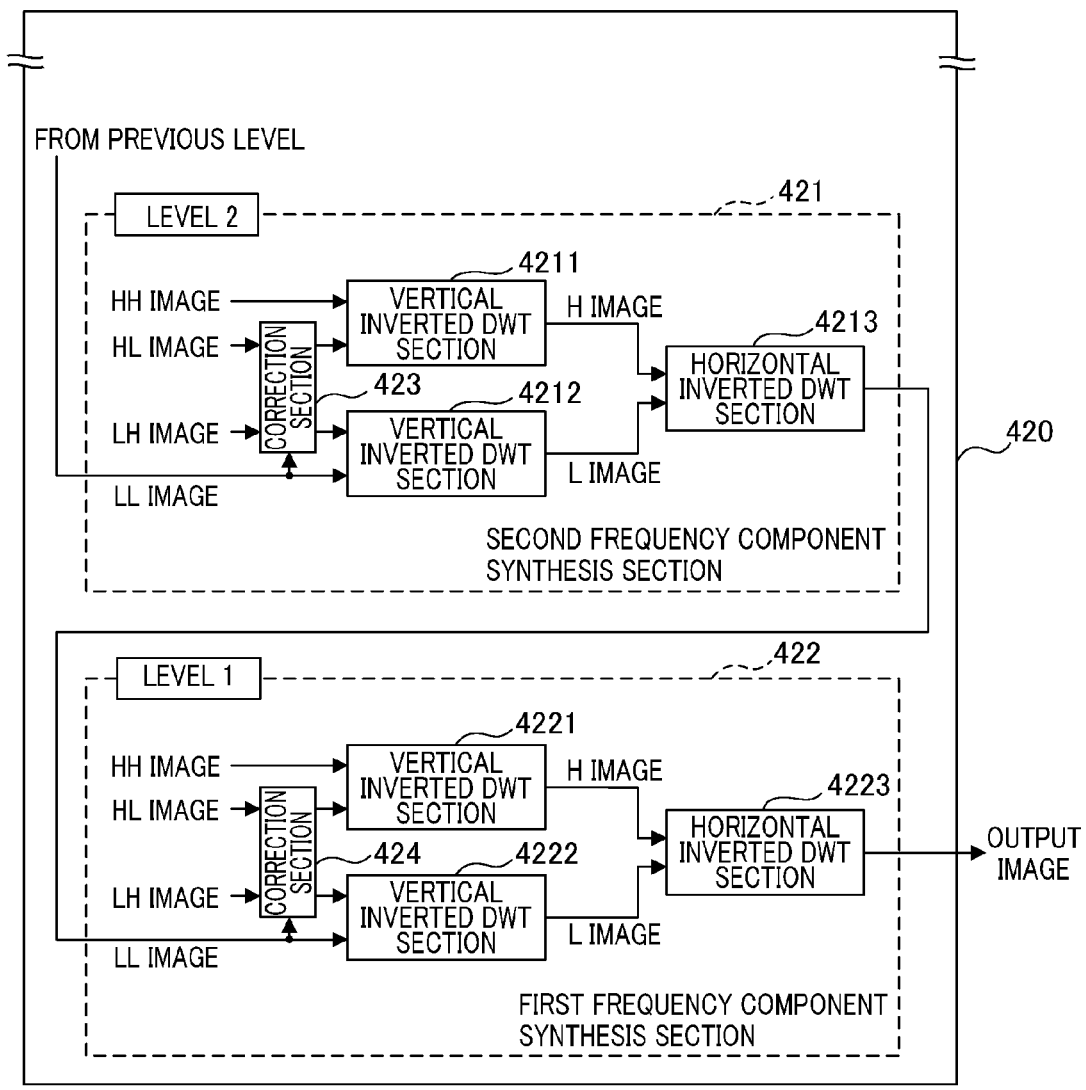
FIG. 21 is a functional block diagram showing an example of the circuit configuration of a frequency component synthesis section 420 in the fourth embodiment.

The fourth embodiment is the same as the first embodiment except that the frequency component synthesis section 420, which performs an operation different from that of the frequency component synthesis section 120, is provided in place of the frequency component synthesis section 120. Hence, the portions which have the same function as those of the above-described first embodiment are denoted by the same reference numerals as in the first embodiment, and the redundant description thereof is appropriately omitted. FIG. 21 is a functional block diagram showing an example of the circuit configuration of the frequency component synthesis section 420 in the fourth embodiment.

The frequency component synthesis section 420 includes first, second, etc., frequency component synthesis sections 421, 422, etc. containing vertical inverted DWT sections 4211, 4212, 4221, 4222, and so on and horizontal inverted DWT sections 4213, 4223, and so on. Each of these has the same function as that of the vertical inverted DWT sections 1211, 1212, 1221, 1222, etc. and the horizontal inverted DWT sections 1213, 1223, etc. of the first embodiment. The frequency component synthesis section 420 also includes the correction sections 423, 424, and so on. The HL and LH images and the LL image that have been generated in each frequency component resolution section are input to the correction sections 423, 424, etc.

Figure 22:
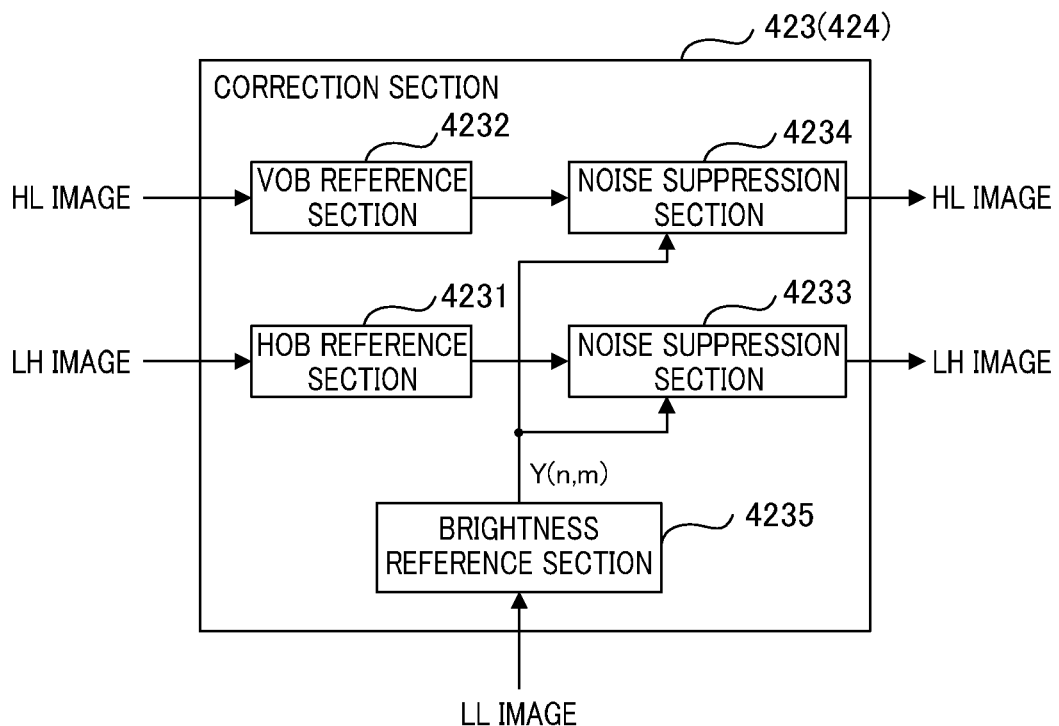
FIG. 22 is a block diagram showing a configuration of a correction section 423.

FIG. 22 is a block diagram showing a configuration of the correction section 423. The correction section 423 includes an HOB reference section 4231, a VOB reference section 4232, and noise suppression sections 4233 and 4234. As in the first embodiment, both the HOB reference section 4231 and the VOB reference section 4232 include a noise amount calculation section and a noise determination section (both not shown). As in the first embodiment, both the noise suppression sections 4233 and 4234 include a noise separation section (not shown). The correction section 423 also includes a brightness reference section 4235.

Figure 23:
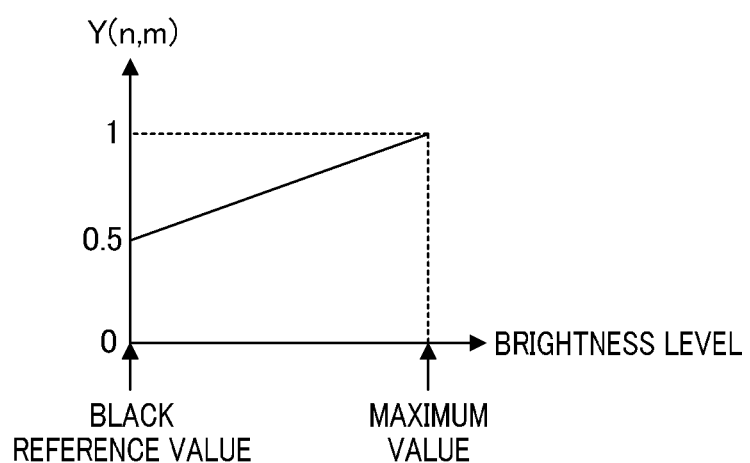
FIG. 23 is a graph for calculating the brightness coefficient from the brightness level of an object.

The brightness reference section 4235 divides each scaling coefficient of the input LL image by $2^j$ to thereby transform it into a brightness level, provided that j is a resolution level of the LL image. The brightness coefficient Y(n, m) according to the brightness level as shown in FIG. 23, for example, is calculated from the value for each pixel of the LL image that has been transformed into the brightness level, provided that n and m are a vertical position and a horizontal position, respectively. FIG. 23 is a graph for calculating the brightness coefficient from the brightness level of an object.

The brightness coefficient Y(n, m) that has been calculated by the brightness reference section 4235 is input to the noise suppression sections 4233 and 4234. Processing carried out by the noise suppression sections 4233 and 4234 is substantially the same as that carried out by the noise suppression sections 1233 and 1234 shown in FIG. 9 of the first embodiment, and therefore a detailed description will be omitted. The noise suppression sections 4233 and 4234 differ from the noise suppression sections 1233 and 1234 in that the correction coefficient to be multiplied by the wavelet expansion coefficient is not a fixed value as shown in Formula (12), but is the value of the correction coefficient times the brightness coefficient Y(n, m) that has been calculated as described above. In other words, as shown in Formula (14), the correction coefficient depending on the brightness for each unit pixel is used for multiplication of a component having a smaller expansion coefficient than the threshold value Wth (n), that is, a pattern noise component.

[Formula 14]

$$\omega'^{(j,h)}_{n,m} = \omega^{(j,h)}_{n,m} \times c \quad c = \begin{cases} 0.4 \times Y(n, m) & |\omega^{(j,h)}_{n,m}| < Wth(n) \\ 1 & |\omega^{(j,h)}_{n,m}| \geq Wth(n) \end{cases} \quad \text{Formula (14)}$$

As described above, in the fourth embodiment, a correction coefficient used to multiply the HL and LH images at the noise suppression section in the correction section provided for each frequency band is varied depending on the brightness of a shot image. When pattern noise occurs in the shot image in which a clearly defined light-dark portion is mixed, the signal level is low in the dark portion compared to that in the light portion, resulting in a poor S/N ratio. Consequently, pattern noise is not noticeable in the light portion, whereas pattern noise is noticeable in the dark portion. Therefore, when noise is suppressed by using a correction coefficient that is uniform for the entire image, pattern noise in the dark portion still remains visible although pattern noise in the light portion is invisible.

In order to solve these cases, in the fourth embodiment, a correction coefficient used to multiply each location of the HL and LH images in the noise suppression section depending on the brightness level of a shot image is varied. In other words, a correction coefficient is set smaller at a location where the brightness level of a shot image is lower so as to increase the noise suppression amount.

The brightness level is acquired from the LL image that is a low frequency component for each frequency band instead of acquiring the brightness level from a shot image. This LL image has the same resolution as that of the HL and LH images which are to be corrected so that there is no need to calculate the brightness for each unit pixel by applying a resolution transform again from a shot image. It should be noted that the resolution of the LL image that has been generated in the frequency component resolution section of the first embodiment, both in vertical and horizontal direction, is reduced by half per 1 level resolution compared to that of the LL image before being resolved, whereas each scaling coefficient is increased twice.

Hence, the LL image of level 1 that has been generated in the first frequency component resolution section can be converted to a brightness level by dividing each scaling coefficient by 2. The LL image of level 2 can be converted to a brightness level by dividing each scaling coefficient by 22. In this way, the LL image of level j is converted to a brightness level for use by dividing the scaling coefficient by 2'. According to the fourth embodiment, correction coefficient is changed according to the brightness level, whereby pattern noise in the dark portion can be unnoticeably suppressed even for a shot image having a large brightness difference within an image.

(Fifth Embodiment)

In an image with a low resolution that has been generated in the frequency component resolution section of the first embodiment, a component of the effective section is also included in the frequency component of the OB pixel adjacent to the effective section. Hence, cases arise in that this pixel cannot be used when calculating the average of the OB section. In the fifth embodiment, the aforementioned case is solved by separating an input image into an effective section, an HOB section, and a VOB section, respectively, so as to provide individual frequency resolution. Also in the fifth embodiment, the portions which have the same function as those of the above-described first embodiment are denoted by the same reference numerals as in the first embodiment, and the redundant description thereof is appropriately omitted.

Figure 24:
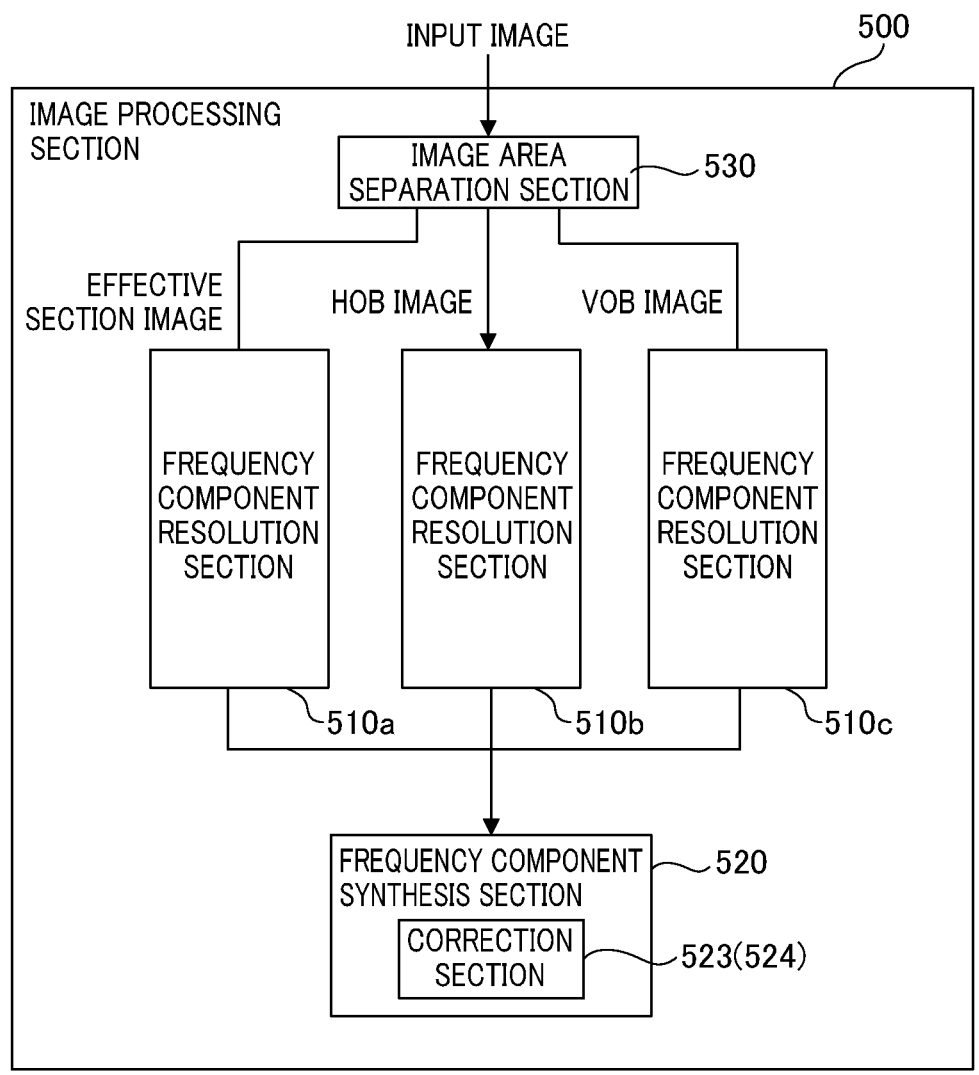
FIG. 24 is a block diagram showing an example of the circuit configuration of an image processing section 500 of the fifth embodiment.

FIG. 24 is a block diagram showing an example of the circuit configuration of the image processing section 500 of the fifth embodiment. The image processing section 500 includes frequency component resolution sections 510a, 510b, and 510c, the frequency component synthesis section 520, and an image area separation section 530. The image area separation section 530 separates an input image into three sections: the effective section, the HOB section, and the VOB section. The separated images are respectively input to the frequency component resolution sections 510a, 510b, and 510c. The internal configuration of the frequency component resolution sections 510a, 510b, and 510c is the same as that of the frequency component resolution section 110 shown in FIG. 6 of the first embodiment. In order to distinguish among the images generated in each frequency component resolution section, the images for each frequency band to be generated from the effective section of the image in the frequency component resolution section 510a are intended to be $HH_a$, $HL_a$, $LH_a$, and $LL_a$. The frequency component resolution section 510b is intended to generate the $HH_h$, $HL_h$, $LH_h$, and $LL_h$ images for each frequency band from the HOB image. The frequency component resolution section 510c is intended to generate the $HH_v$, $HL_v$, $LH_v$, and $LL_v$ images for each frequency band from the VOB image. Since the $HH_h$ and $HL_h$ images and $HH_v$ and $LH_v$ images are not directly used in this embodiment, they may not be provided. The images that have been generated in the frequency component resolution sections 510a, 510b, and 510c are input to the frequency component synthesis section 520.

Figure 25:
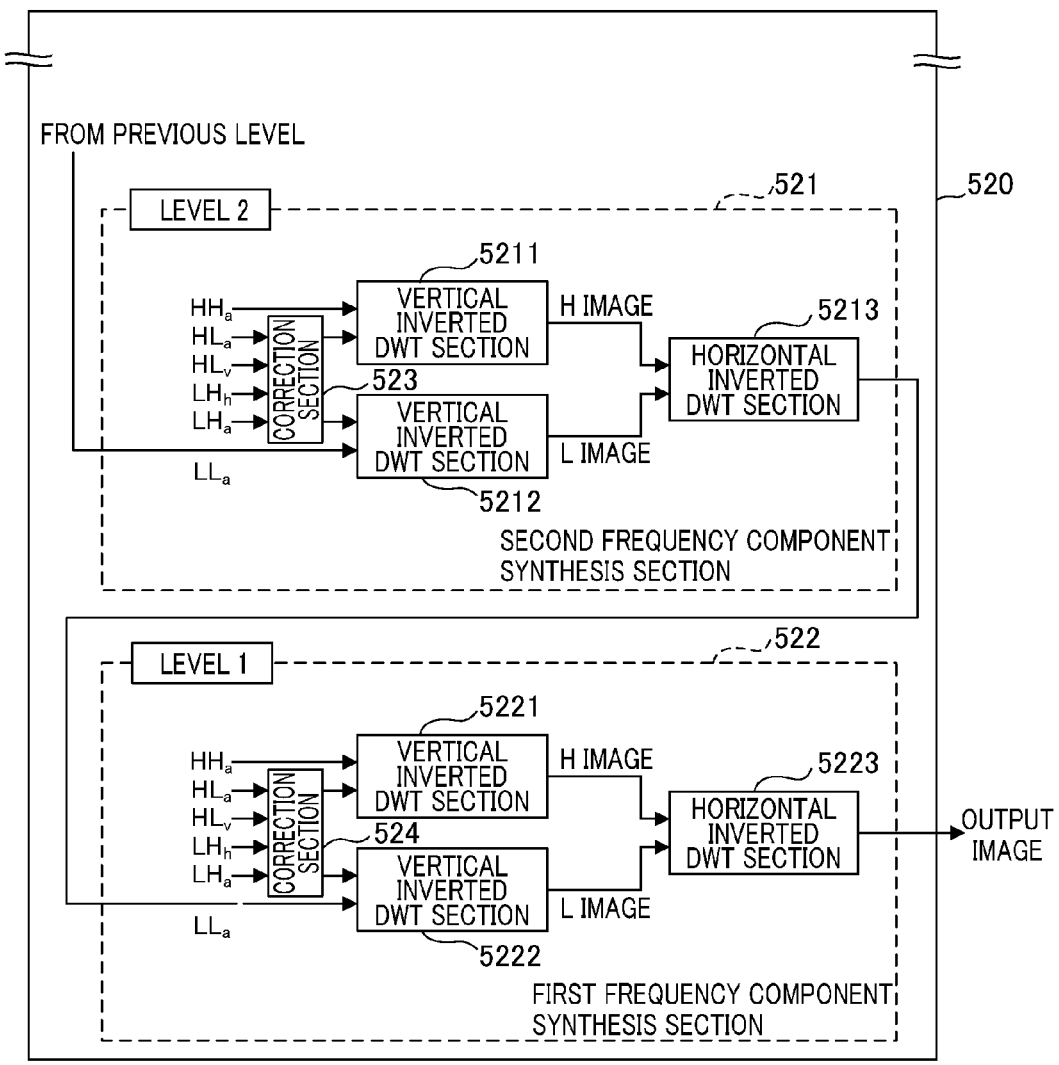
FIG. 25 is a functional block diagram showing an example of the circuit configuration of a frequency component synthesis section 520.

FIG. 25 is a functional block diagram showing an example of the circuit configuration of the frequency component synthesis section 520. The frequency component synthesis section 520 (521, 522) includes vertical inverted DWT sections 5211, 5212, 5221, 5222, and so on and horizontal inverted DWT sections 5213, 5223, and so on. Each of these has the same function as that of the vertical inverted DWT sections 1211, 1212, 1221, 1222, etc. and the horizontal inverted DWT sections 1213, 1223, etc. of the first embodiment. The frequency component synthesis section 520 also includes the correction sections 523, 524, and so on. The $HL_a$ and $LH_a$ that have been generated from the effective section of the image, the $LH_h$ that has been generated from the image of the HOB section, and the $HL_v$ that has been generated from the image of the VOB section are input to the correction sections 523, 524, and the like.

Figure 26:
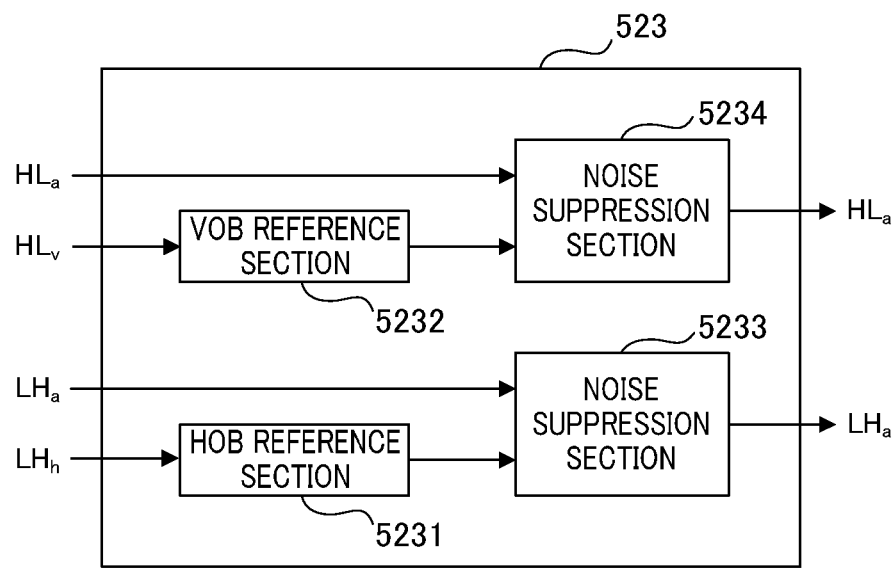
FIG. 26 is a block diagram showing a configuration of a correction section 523.

FIG. 26 is a block diagram showing a configuration of the correction section 523. The correction section 523 includes an HOB reference section 5231, a VOB reference section 5232, and noise suppression sections 5233 and 5234. As in the first embodiment, both the HOB reference section 5231 and the VOB reference section 5232 include a noise amount calculation section and a noise determination section (both not shown). As in the first embodiment, both the noise suppression sections 5233 and 5234 include a noise separation section (not shown).

The HOB reference section 5231 receives an input of an $LH_h$ image, calculates the average ave(n) of the absolute values of the expansion coefficients for each row, and compares it with the noise determination reference value, where n is a vertical position. The details of this processing are similar to that described in the HOB reference section 1231 shown in FIG. 9 of the first embodiment.

The VOB reference section 5232 inputs an $HL_v$ image, calculates the average ave(m) of the absolute values of the expansion coefficients for each column, and compares it with the noise determination reference value, where m is a horizontal position. The details of this processing are similar to that described in the VOB reference section 1232 shown in FIG. 9 of the first embodiment. The noise suppression sections 5233 and 5334 respectively input the $HL_a$ and $LH_a$ images that have been generated from the effective section of the image. The noise suppression section 5233 performs noise suppression processing on the row determined by the HOB reference section 5231 to have pattern noise. The noise suppression section 5234 performs noise suppression processing on the column in which the VOB reference section 5232 has determined that pattern noise has occurred. The details of this processing are similar to that described in the noise suppression sections 1233 and 1234 shown in FIG. 9 of the first embodiment.

The noise suppression processing in the correction section 523 is performed for each frequency band so as to sequentially synthesize each image that has been resolved by the frequency component synthesis section, whereby the effective section of the image in which pattern noise has been suppressed can be obtained. According to the fifth embodiment, all the pixels of the OB section can be used for calculating the average of the OB section, whereby the noise suppression processing can be performed more accurately.

(Sixth Embodiment)

In the first embodiment, the image sensor 60 (shown in FIG. 27) includes two OB sections which are provided in a strip at one end of the horizontal direction and the vertical direction, respectively. More specifically, the image sensor 60 includes the horizontal optical black (HOB) 61 provided at the left end of the image sensor 60 and the vertical optical black (VOB) 62 provided at the upper end of the image sensor 60, as shown in FIG. 2. In contrast, the image sensor 60 of the present embodiment includes OB sections (first and second light-shielded pixel areas) which are provided at both ends of the horizontal direction and the vertical direction, respectively. In other words, the OB sections are provided in strips on two opposite sides. The operation other than that carried out by the correction section is the same as that of the first embodiment, and no further description will be given here.

Figure 27:
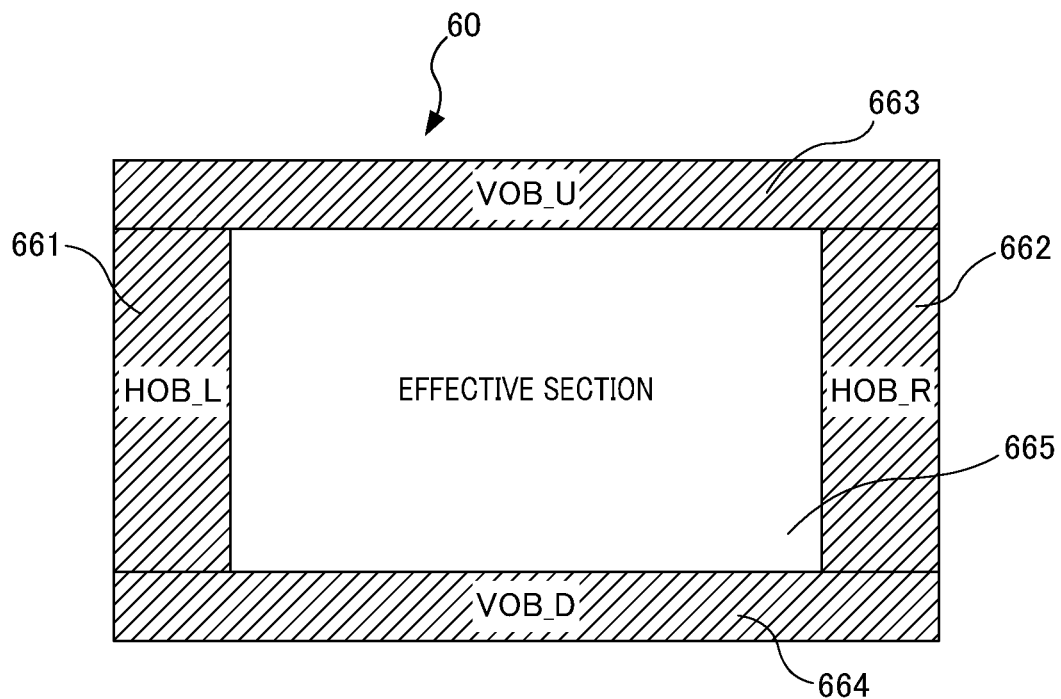
FIG. 27 is a view showing a schematic configuration of the image sensor 60 of the sixth embodiment using the CMOS image sensor.

FIG. 27 is a view showing a schematic configuration of the image sensor 60 of the present embodiment using the CMOS image sensor. The image sensor 60 includes horizontal optical blacks (HOB_L 661 and HOB_R 662), vertical optical blacks (VOB_U 663 and VOB_D 664), and an effective section 665, as the pixel area. The HOB_L 661 and HOB_R 662 are light-shielded pixel areas which are respectively provided in strips at the left and right ends of the pixel area and are light-shielded so as to prevent light reflected from an object from reaching the image sensor 60. The VOB_U 663 and VOB_D 664 are light-shielded pixel areas which are respectively provided in strips at the upper and lower ends of the pixel area and are light-shielded so as to prevent light reflected from an object from reaching the image sensor 60. The effective section 665 is a non-light-shielded pixel area which can be reached by light reflected from an object without being light-shielded.

Figure 28A:
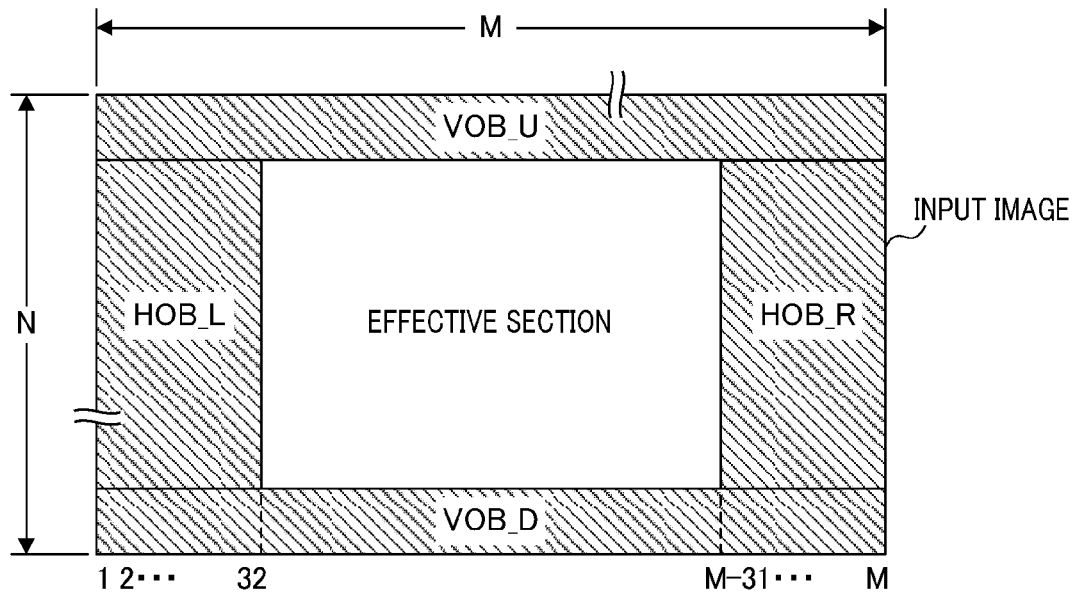
FIGS. 28A and 28B are diagrams illustrating correction processing.
Figure 28B:
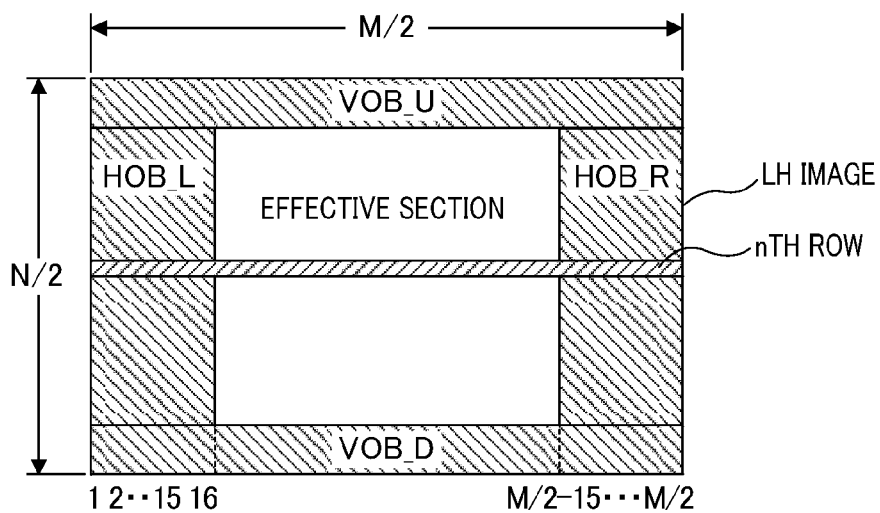
Figure 29:
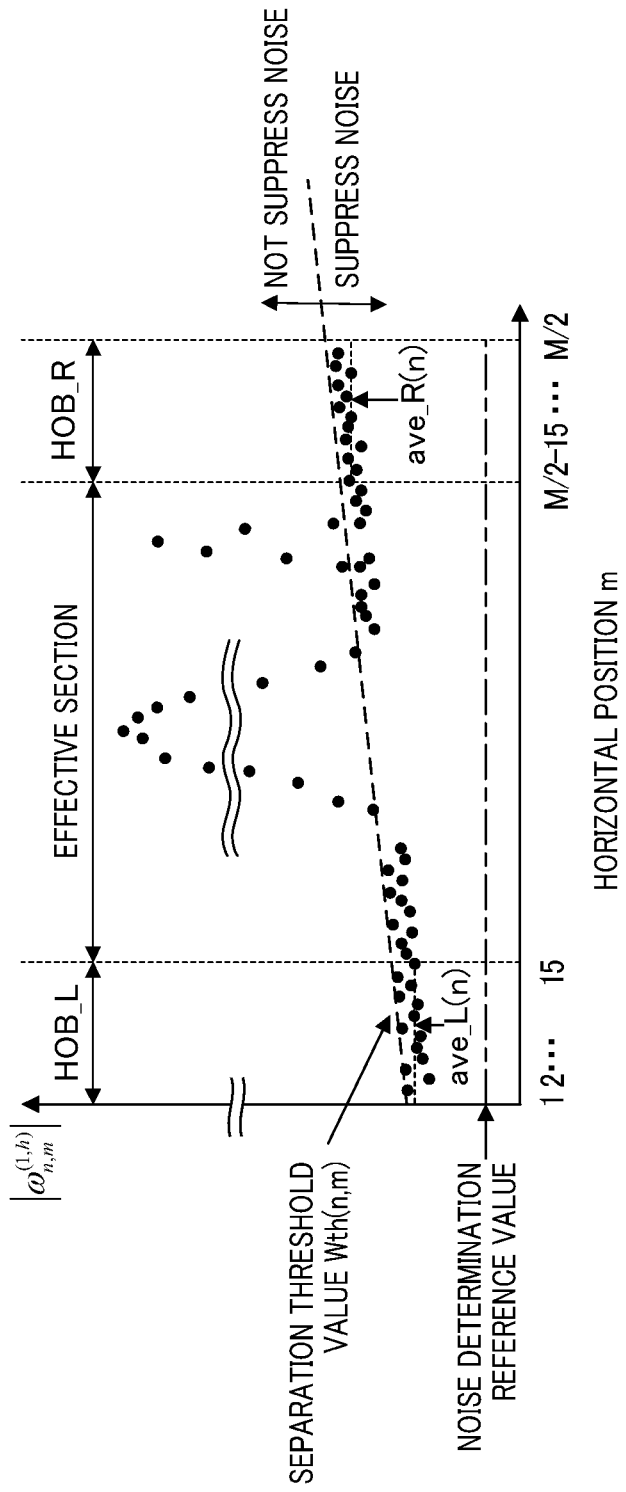
FIG. 29 is a view showing the absolute values of the wavelet expansion coefficients of the row, in which pattern noise is present, in the LH image.

Hereinafter, the flow of processing of each row of the LH image carried out by the correction section 123 of the sixth embodiment will be described. FIG. 28 is a diagram illustrating correction processing. FIG. 28A shows an example of an input image. In the example in FIG. 28A, N is the number of pixels in the vertical direction, and M is the number of pixels in the horizontal direction. In this drawing, the left and right end of each 32 columns are HOB_L and HOB_R areas, respectively. This input image is input to the frequency component resolution section 110 so as to generate an LH image by frequency resolution. Such an LH image is shown in FIG. 28B. In the aforementioned LH image, the number of pixels is ½ of the pre-resolved image for both column and row. Hence, HOB_L and HOB_R areas in the LH image correspond to the respective 16 columns provided at the left and right end. It should be noted, however, that as can be understood from the calculation using Formula (2), a column adjacent to the effective section includes both components of the HOB section and the effective section. FIG. 29 shows the result of the calculated absolute values after the extraction of a value (wavelet expansion coefficient) of a row of the LH image.

A pattern noise component is included in both the effective section and the light-shielded HOB section, while an object edge component is included only in the effective section. Hence, by calculating the averages ave_L(n) and ave_R(n) of the absolute values of the wavelet expansion coefficients for the respective rows of HOB_L and HOB_R at the noise amount calculation section, pattern noise component amounts for the respective rows corresponding to the respective frequency bands can be calculated, where n represents the number of rows. It should be noted, however, that since a component of the effective section is included in a column of the HOB_L and HOB_R areas adjacent to the effective section, the column is not used for the calculation of the averages ave_L(n) and ave_R(n).

In the noise determination section, the ave_L(n) and ave_R(n) that have been calculated at the noise amount calculation section are compared with the noise determination reference values which are respectively set for the HOB_L and HOB_R areas. When the ave_L(n) and ave_R(n) are both above the noise determination reference value, the noise determination section determines that pattern noise is present in that row. A condition for determining that pattern noise is present may also be such that any one of the ave_L(n) and ave_R(n) is above the noise determination reference value. As in the second embodiment, the average of the absolute values of the expansion coefficients for the respective HOB_L area and HOB_R area of the HH image, which is a diagonal direction high frequency component formed in the respective frequency component resolution sections, is used as the noise determination reference value.

Next, processing in the noise suppression section 1233 will be described. The noise suppression section 1233 performs noise suppression processing on the row in which the noise determination section 1231b of the HOB reference section 1231 has determined that pattern noise has occurred. The effective section of the row for which it has been determined that noise has occurred includes an edge component and pattern noise component of the object. Since the amplitude of pattern noise is smaller than the signal level of the object in the effective section, the pattern noise component of the absolute values of the wavelet expansion coefficients to which a frequency transform has been applied is also smaller than the object edge component. Therefore, the function Wth(n, m) by linear interpolation on its values of the ave_L(n) and ave_R(n) that have been calculated in the HOB_L and HOB_R areas, respectively, as shown in Formula (15) can be used as a threshold value for separating the pattern noise component and object edge component, where n represents the number of rows and m represents the number of columns. In Formula (15), taking account of the fluctuations of the expansion coefficient, the coefficient for multiplication is 1.1. The following formula is represented as a linear function but may be any type of function.

[Formula 15]

$$Wth(n, m) = \left\{\frac{\text{ave\_R}(n) - \text{ave\_L}(n)}{M}m + \text{ave\_R}(n)\right\} \times 1.1 \quad \text{Formula (15)}$$

The noise separation section 1233a separates the pattern noise component and the object edge component using the aforementioned threshold value. By using the aforementioned method, a pattern noise component can be accurately separated from an object edge component, even if pattern noise has different intensity in the left and right direction. Next, the absolute value of the wavelet expansion coefficient in the effective section is calculated per unit pixel. The correction coefficient is multiplied by the wavelet expansion coefficient according to the magnitude of the absolute value of each unit pixel. This correction coefficient can be summarized as shown in Formula (16), where $w_{n,m}^{(j,h)}$ is the wavelet expansion coefficient before correction, and $w'_{n,m}^{(j,h)}$ is the wavelet expansion coefficient after correction. Also, j is a level representing a frequency band, and h is a horizontal direction component.

[Formula 16]

$$\omega'^{(j,h)}_{n,m} = \omega^{(j,h)}_{n,m} \times c \quad c = \begin{cases} c' & |\omega^{(j,h)}_{n,m}| < Wth(n, m) \\ 1 & |\omega^{(j,h)}_{n,m}| \geq Wth(n, m) \end{cases} \quad \text{Formula (16)}$$

In a unit pixel where the absolute value of the wavelet expansion coefficient in the effective section is less than the threshold value Wth(n, m), in other words, when the unit pixel is a pattern noise component, the correction coefficient c' (0<c'<1) is multiplied by the wavelet expansion coefficient so as to suppress the pattern noise component. In a unit pixel where the absolute value of the wavelet expansion coefficient in the effective section is more than the threshold value Wth (n, m), in other words, when the unit pixel is the object edge component, the correction coefficient c=1 is multiplied by the wavelet expansion coefficient in order to retain the object edge component. The correction coefficient c' to be multiplied by the pattern noise component is calculated from the ave_L(n) and ave_R(n) as shown in Formula (17).

[Formula 17]

$$c' = \frac{1/\text{ave\_R}(n) - 1/\text{ave\_L}(n)}{M}m + 0.4 \quad \text{Formula (17)}$$

Figure 30:
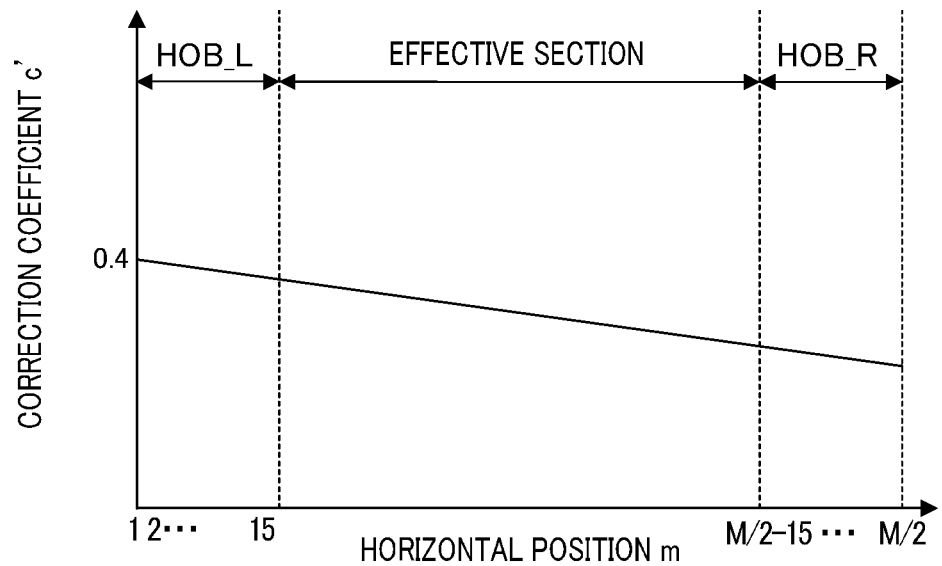
FIG. 30 is a graph of a correction coefficient c'.
Figure 31:
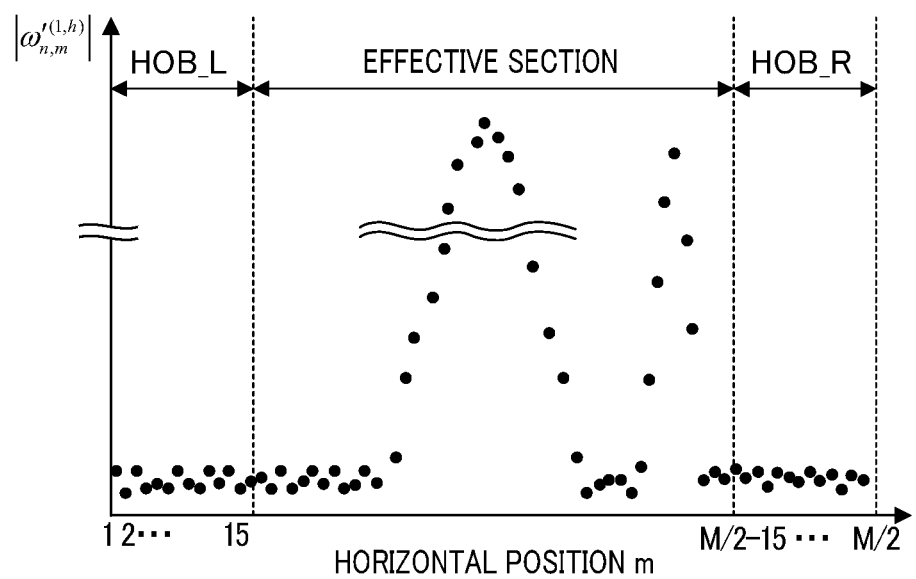
FIG. 31 is a view showing the absolute value of the wavelet expansion coefficient after the noise suppression processing to the row, in which pattern noise is present, in the LH image.

The correction coefficient c' shown in Formula (17) is a straight line extending between the inverses of the ave_L(n) and ave_R(n). A graph of the correction coefficient c' is shown in FIG. 30. The smaller the correction coefficient c' becomes, the greater the pattern noise component becomes, whereby the noise suppression amount is also increased. Consequently, an intensity difference between the right and left after noise suppression can be reduced. In contrast to the expansion coefficient $w_{n,m}^{(j,h)}$ shown in FIG. 29, the absolute values of the expansion coefficient $w'_{n,m}^{(j,h)}$ after the computation shown in Formulae (16) and (17) are shown in FIG. 31. By determining the threshold value using both values of the HOB_L and HOB_R areas, and using the correction coefficient corresponding to the pattern noise component as shown in Formula (17), pattern noise having an intensity difference between the left and right can be advantageously suppressed.

Figure 32:
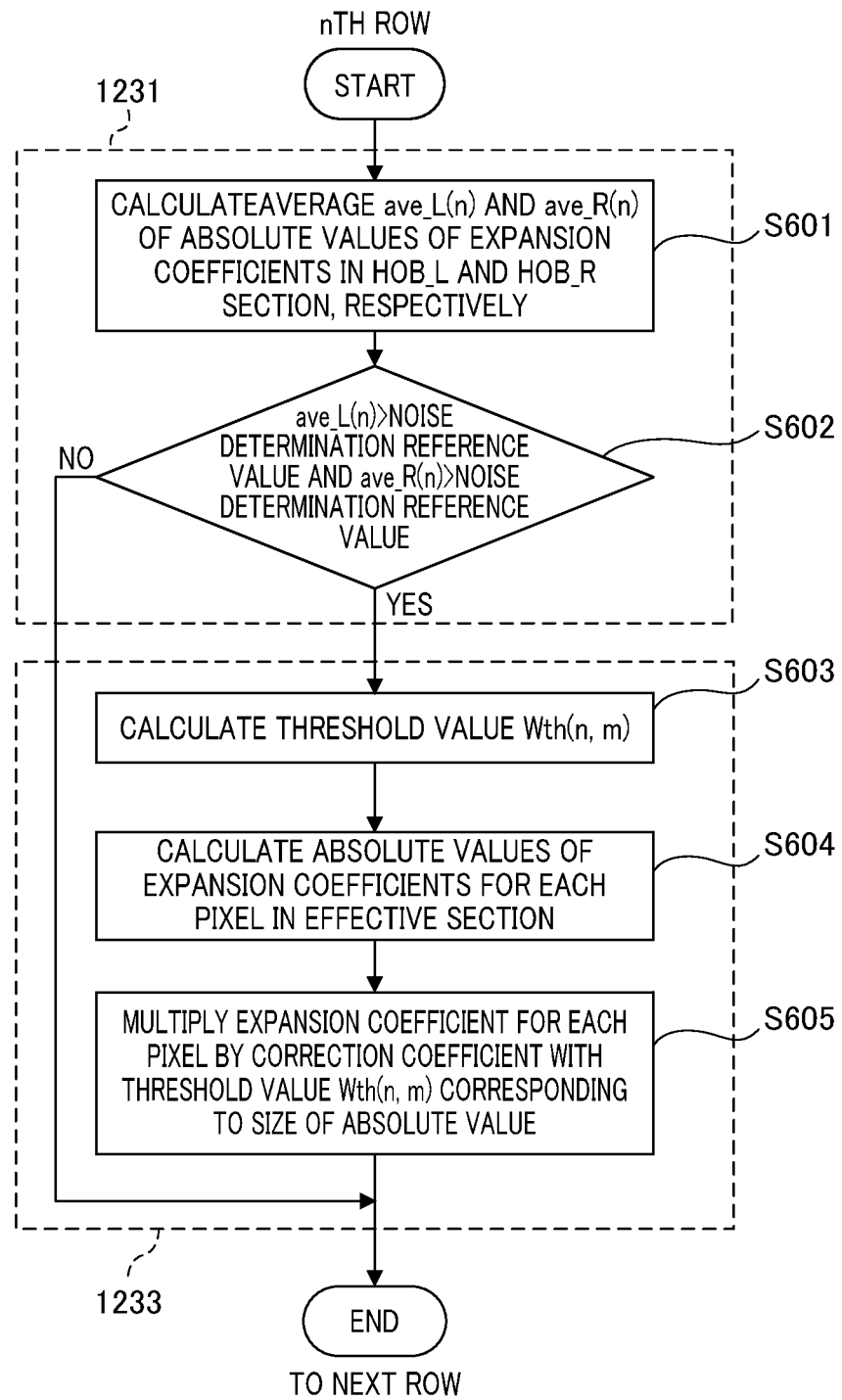
FIG. 32 is a flowchart showing the flow of processing of each row of the LH image carried out by the correction section.

Correction processing (an example of processing operations on an LH image) carried out by the correction section 123 as described above is summarized using a flowchart. FIG. 32 is a flowchart showing the flow of processing of each row of the LH image carried out by the correction section. Firstly, the averages ave_L(n) and ave_R(n) of the absolute values of the expansion coefficients in the respective HOB_L and HOB_R areas are calculated by the noise amount calculation section 1231a of the HOB reference section 1231 (step (hereinafter referred to as "S") 601). Next, the noise determination section 1231b compares each of the ave_L(n) and ave_R(n) that has been calculated by the noise amount calculation section 1231a with the pattern noise determination reference value (S602).

When either of or both of the ave_L(n) and ave_R(n) are less than the noise determination reference value and it is determined that there is no pattern noise in that row (S602: No), the noise suppression section does not perform noise suppression processing, and the processing for that row is thereby ended. On the other hand, when both of the ave_L(n) and ave_R(n) are greater than the determination reference value (S602: Yes), the noise suppression section 1233 performs noise suppression processing. The noise separation section 1233a in the noise suppression section 1233 calculates the threshold value Wth(n) for separating pattern noise and an object edge component with respect to the row for which it has been determined that pattern noise has occurred (S603).

Next, the absolute value of the expansion coefficient for each pixel in the effective section is calculated (S604). The correction coefficient having the threshold value Wth(n, m) is multiplied by the wavelet expansion coefficient for each pixel according to the magnitude of the calculated absolute value so as to suppress the pattern noise component (S605). Processing from S601 to S605 is performed on each row. By performing the aforementioned processing in the correction sections of the respective frequency component synthesis sections, only pattern noise component is suppressed, whereby the LH image with the object edge component being held is obtained.

Processing carried out by the HOB reference section 1231 and the noise suppression section 1233 on the LH image has been described. When the processing described above is performed for the HL image in the VOB reference section 1232 and the noise suppression section 1234, pattern noise component in the vertical direction can be suppressed.

(Seventh Embodiment)

As in the sixth embodiment, the image sensor 60 of the present embodiment includes the OB sections which are provided in two strips at both ends of the horizontal direction and the vertical direction, respectively. In the sixth embodiment, the pattern noise component is suppressed by multiplying the wavelet expansion coefficient of the effective section by a correction coefficient of less than 1 at the noise suppression section in the correction section. As another noise suppression method in the seventh embodiment, noise component is removed by subtracting the pattern noise component that has been calculated from the HOB_L and HOB_R areas from the expansion coefficient of the effective section.

Figure 33:
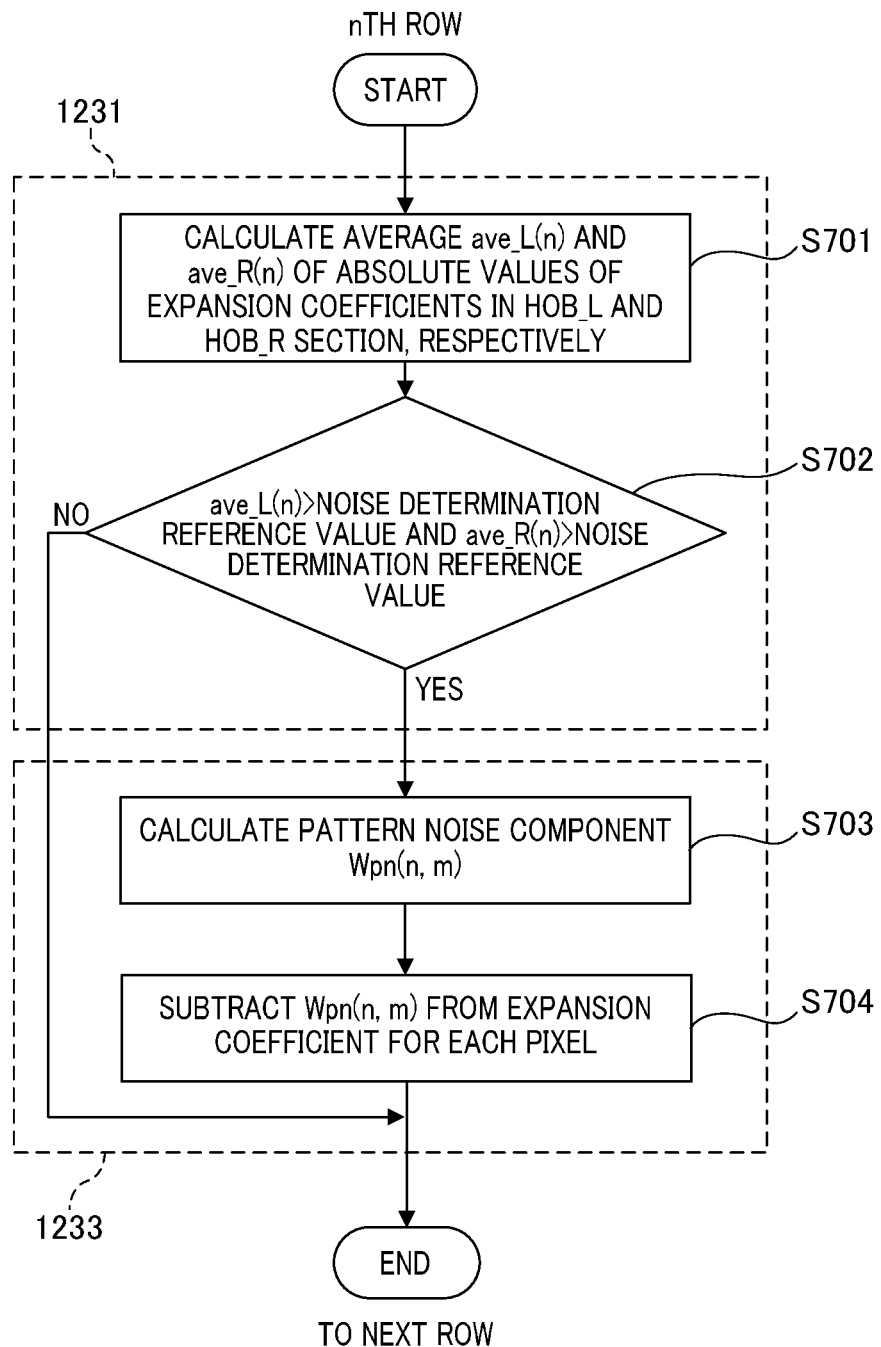
FIG. 33 is a flowchart showing the flow of processing of each row of the LH image carried out by the correction section in the seventh embodiment.

FIG. 33 is a flowchart showing the flow of processing of each row of the LH image carried out by the correction section in the seventh embodiment. Steps S701 and S702 are the same as S601 and S602 shown in FIG. 32 of the sixth embodiment. In S703, the pattern noise component Wpn(n, m) is calculated using Formula (18) from the values of the ave_L(n) and ave_R(n) that have been calculated by the HOB reference section. In Formula (18), n represents the number of rows and m represents the number of columns.

[Formula 18]

$$Wpn(n, m) = \frac{\text{ave\_R}(n) - \text{ave\_L}(n)}{M} m + \text{ave\_R}(n) \quad \text{Formula (18)}$$

In S704, the expansion coefficient $w'_{n,m}{}^{(j,h)}$ after correction is calculated by subtracting the pattern noise component Wpn (n, m) from the expansion coefficient $w_{n,m}{}^{(j,h)}$ for each pixel of the effective section as shown in Formula (19).

[Formula 19]

$$w'_{n,m}{}^{(j,h)} = \text{sign}(w_{n,m}{}^{(j,h)}) \times |w_{n,m}{}^{(j,h)} - Wpn(n,m)| \quad \text{Formula (19)}$$

Figure 34A:
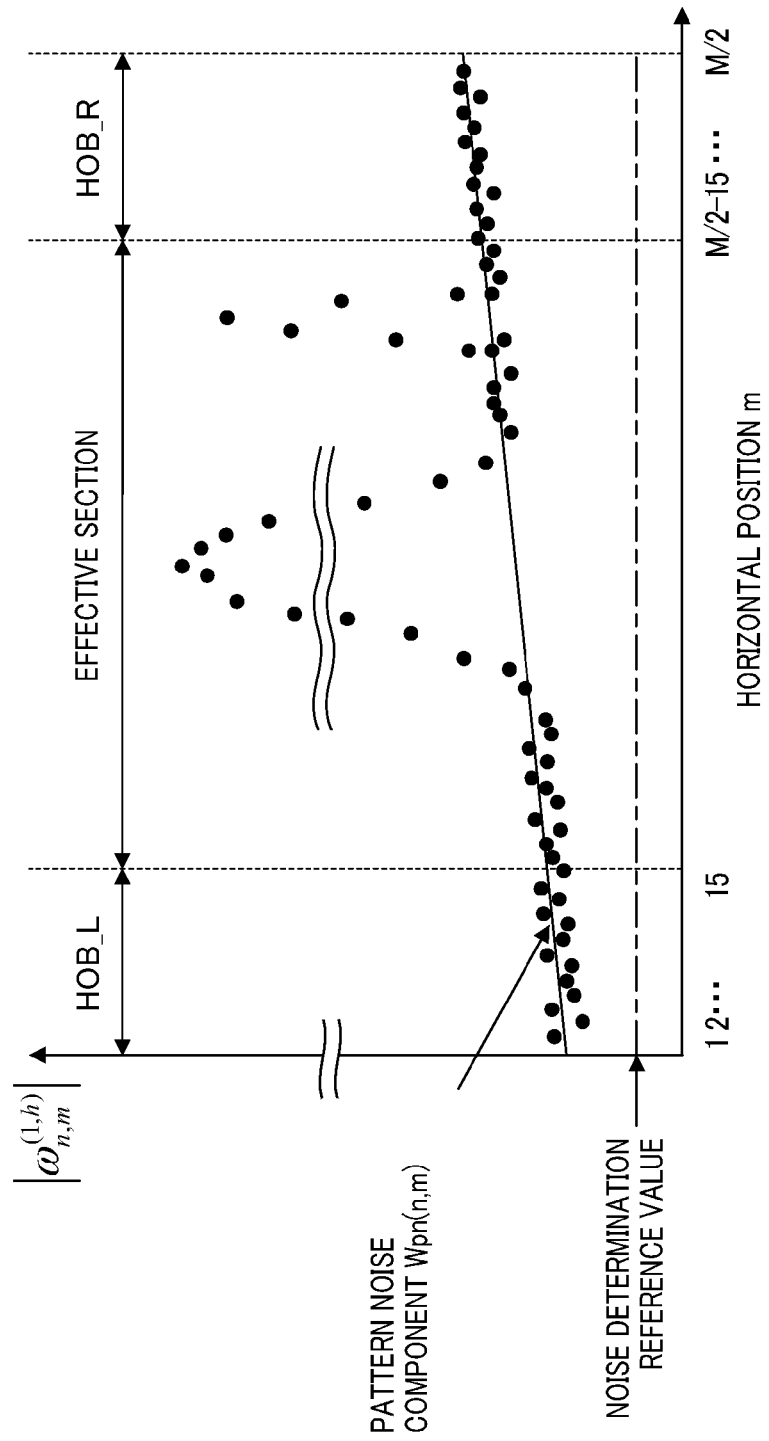
FIGS. 34A and 34B are diagrams illustrating processing carried out by the noise suppression section in the seventh embodiment.
Figure 34B:
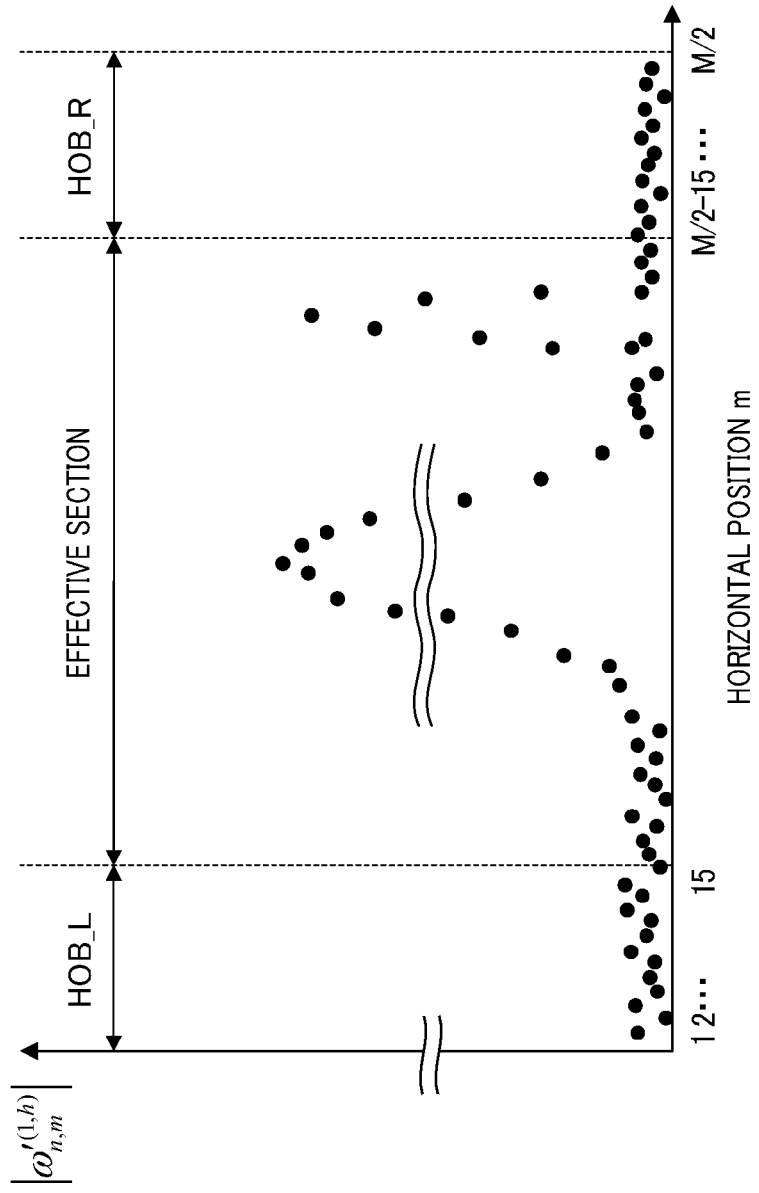

FIG. 34A shows the result of the calculated absolute values after the extraction of a value (wavelet expansion coefficient) of a row of the LH image. FIG. 34A also shows the pattern noise component Wpn(n, m) that has been calculated using Formula (18). FIG. 34B shows the result obtained from processing shown in Formula (19) performed on the expansion coefficient. By performing the aforementioned processing for each row, a pattern noise component having an intensity difference in the left and right direction can be removed from the effective section.

(Modifications)

It is to be understood that the present invention is not limited to the preferred embodiment described above. Various changes and modifications may be made in the invention without departing from the spirit and scope thereof.

(1) In each of the foregoing embodiments, while correction processing is performed by the image processing section provided within the image sensing apparatus, correction processing may be performed by an external circuit such as a personal computer for example after the output of an image shot by the image sensor. In this case, a personal computer or the like can function as a means equivalent to that of the image processing section described above by installing the image processing program.

(2) While description has been made in each of the foregoing embodiments regarding the example of the digital camera, the present invention is not limited thereto. For example, the present invention may be applied to other forms of the image sensing apparatus such as a video camera or a monitoring camera.

(3) While description has been made in each of the foregoing embodiments regarding the example in which the CMOS image sensor is used as the image sensor 60, the present invention is not limited thereto. For example, the present invention may be applied for the CCD image sensor.

While the embodiments and the variations can be used in an appropriate combination, no further description will be given here. The present invention is not limited to the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application Nos. 2008-207787 and 2009-092987, filed on Aug. 12, 2008 and Apr. 7, 2009 respectively, which are hereby incorporated by reference herein in their entirety.

I claim:

1. An image processing device comprising:
a frequency component resolution section that resolves an image obtained from an image sensor having a light-shielded pixel area and a non-light-shielded pixel area into a low frequency component, a vertical direction high frequency component, a horizontal direction high frequency component, and a diagonal direction high frequency component by performing a wavelet transform on the image;
a noise amount calculation section that calculates a noise amount for the vertical direction high frequency component and the horizontal direction high frequency component in the light-shielded pixel area;
a noise suppression section that suppresses a noise component for the vertical direction high frequency component and the horizontal direction high frequency component in the non-light-shielded pixel area according to the noise amount calculated by the noise amount calculation section; and
a frequency component synthesis section that synthesizes the vertical direction high frequency component and the horizontal direction high frequency component in the non-light-shielded pixel area of which the noise component is suppressed by the noise suppression section, and the low frequency component and the diagonal direction high frequency component in the non-light-shielded pixel area of which a noise component is not suppressed by the noise suppression section to thereby form an image.

2. The image processing device according to claim 1, further comprising:
a noise separation section that separates the noise component from an object component for the frequency component in the non-light-shielded pixel area according to the noise amount that has been calculated by the noise amount calculation section,
wherein the noise suppression section suppresses the noise component that has been separated by the noise separation section.

3. The image processing device according to claim 2, wherein the noise separation section determines the presence or absence of noise generation for each column or row by comparing the amount of column or row noise calculated by the noise amount calculation section with a noise determination reference value, and separates the noise component and object component in the column or row for which it has been determined that noise has occurred.

4. The image processing device according to claim 2, further comprising:
a threshold value determination section that determines a threshold value on the basis of the noise amount that has been calculated by the noise amount calculation section,
wherein the noise separation section separates the noise component and the object component using the threshold value determined by the threshold value determination section.

5. The image processing device according to claim 1, wherein the frequency component synthesis section performs an inverse wavelet transform.

6. An image sensing apparatus comprising:
an image sensor having a light-shielded pixel area and a non-light-shielded pixel area;
a frequency component resolution section that resolves an image obtained from the image sensor into a low frequency component, a vertical direction high frequency component, a horizontal direction high frequency component, and a diagonal direction high frequency component by performing a wavelet transform on the image;
a noise amount calculation section that calculates a noise amount for the vertical direction high frequency component and the horizontal direction high frequency component in the light-shielded pixel area;
a noise suppression section that suppresses a noise component for the vertical direction high frequency component and the horizontal direction high frequency component in the non-light-shielded pixel area according to the noise amount calculated by the noise amount calculation section; and
a frequency component synthesis section that synthesizes the vertical direction high frequency component and the horizontal direction high frequency component in the non-light-shielded pixel area of which the noise component is suppressed by the noise suppression section, and the low frequency component and the diagonal direction high frequency component in the non-light-shielded pixel area of which a noise component is not suppressed by the noise suppression section to thereby form an image.

7. An image processing method comprising the steps of:
resolving an image obtained from an image sensor having a light-shielded pixel area and a non-light-shielded pixel area into a low frequency component, a vertical direction high frequency component, a horizontal direction high frequency component, and a diagonal direction high frequency component by performing a wavelet transform on the image;
calculating a noise amount for the vertical direction high frequency component and the horizontal direction high frequency component in the light-shielded pixel area;
suppressing a noise component for the vertical direction high frequency component and the horizontal direction high frequency component in the non-light-shielded pixel area according to the calculated noise amount; and
synthesizing the vertical direction high frequency component and the horizontal direction high frequency component in the non-light-shielded pixel area of which the noise component is suppressed, and the low frequency component and the diagonal direction high frequency component in the non-light-shielded pixel area of which a noise component is not suppressed to thereby form an image.

8. A non-transitory computer-readable medium storing a program which, when executed on a computer, causes the computer to:
resolve an image obtained from an image sensor having a light-shielded pixel area and a non-light-shielded pixel area into a low frequency component, a vertical direction high frequency component, a horizontal direction high frequency component, and a diagonal direction high frequency component by performing a wavelet transform on the image;
calculate a noise amount for the vertical direction high frequency component and the horizontal direction high frequency component in the light-shielded pixel area;
suppress a noise component for the vertical direction high frequency component and the horizontal direction high frequency component in the non-light-shielded pixel area according to the calculated noise amount; and
synthesize the vertical direction high frequency component and the horizontal direction high frequency component in the non-light-shielded pixel area of which the noise component is suppressed, and the low frequency component and the diagonal direction high frequency component in the non-light-shielded pixel area of which a noise component is not suppressed to thereby form an image.

* * * * *